US011929928B2

(12) United States Patent
Seed et al.

(10) Patent No.: US 11,929,928 B2
(45) Date of Patent: Mar. 12, 2024

(54) INTERNET OF THINGS END-TO-END SERVICE LAYER QUALITY OF SERVICE MANAGEMENT

(71) Applicant: Convida Wireless, LLC, Wilmington, DE (US)

(72) Inventors: Dale N. Seed, Allentown, PA (US); Michael F. Starsinic, Newtown, PA (US); Vinod Kumar Choyi, Conshohocken, PA (US); Quang Ly, North Wales, PA (US); Yogendra C. Shah, Exton, PA (US); William Robert Flynn, IV, Schwenksville, PA (US); Shamim Akbar Rahman, Cote St. Luc (CA); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 18/132,477

(22) Filed: Apr. 10, 2023

(65) Prior Publication Data
US 2023/0246964 A1 Aug. 3, 2023

Related U.S. Application Data

(63) Continuation of application No. 17/361,388, filed on Jun. 29, 2021, now Pat. No. 11,658,908, which is a continuation of application No. 15/228,239, filed on Aug. 4, 2016, now Pat. No. 11,102,122.

(60) Provisional application No. 62/200,752, filed on Aug. 4, 2015.

(51) Int. Cl.
H04L 47/10 (2022.01)
H04L 67/12 (2022.01)
H04L 67/14 (2022.01)
H04W 4/70 (2018.01)
H04W 4/80 (2018.01)

(52) U.S. Cl.
CPC .............. H04L 47/10 (2013.01); H04L 67/12 (2013.01); H04L 67/14 (2013.01); H04W 4/70 (2018.02); H04W 4/80 (2018.02)

(58) Field of Classification Search
None
See application file for complete search history.

(56) References Cited

U.S. PATENT DOCUMENTS

| 2007/0104215 | A1 | 5/2007 | Wang et al. |
| 2009/0147731 | A1 | 6/2009 | Chion et al. |
| 2009/0147791 | A1 | 6/2009 | Schutz et al. |
| 2013/0155856 | A1 | 6/2013 | Zhang et al. |
| 2013/0250786 | A1 | 9/2013 | Balasaygun et al. |
| 2013/0297744 | A1 | 11/2013 | Foti |
| 2014/0094159 | A1 | 4/2014 | Raleigh et al. |
| 2015/0029854 | A1 | 1/2015 | Starsinic et al. |
| 2015/0033311 | A1 | 1/2015 | Seed et al. |
| 2016/0219024 | A1 | 7/2016 | Verzun et al. |
| 2016/0227495 | A1 | 8/2016 | Lee et al. |

FOREIGN PATENT DOCUMENTS

| CN | 1918937 A | 2/2007 |
| CN | 102362539 A | 2/2012 |
| CN | 102792759 A | 11/2012 |
| CN | 104159304 A | 11/2014 |
| CN | 104160676 A | 11/2014 |
| JP | 2004-120547 A | 4/2004 |
| JP | 2015-508586 | 3/2015 |
| JP | 2015-121933 A | 7/2015 |
| WO | 2013/153514 A2 | 10/2013 |
| WO | 2017/024100 A1 | 2/2017 |

OTHER PUBLICATIONS

U.S. Appl. No. 17/361,388, filed Jun. 28, 2021.
U.S. Appl. No. 15/228,239, filed Aug. 3, 2016.
3rd Generation Partnership Project; (3GPP) TS 23.682 V13.2.0 3rd Generation Partnership Project; Technical Specification Group Services and System Aspects; Architecture Enhancements to Facilitate Communications with Packet Data Networks and Applications, (Release 13), Jun. 2015, 70 pages.
Carey et al, "Proposal for M2M Service Layer Capabilities", OneM2M Contribution, ARC-2013-244R04, Mar. 30, 2013, 5 pages.
Duan et al, "A Qos Architecture for IOT", Internet of Things, IEEE International Conference on Internet of Things, and Cyber, Physical and Social Computing 2011, Oct. 19, 2011, 717-720.
European Telecommunications Standards Institute (ETSI), TS 102 690 V2.1.1, Technical Specification, Machine-to-Machine Communications (M2M); "Functional Architecture", Oct. 2013, 332 pages.
International Application No. PCT/US2016/045473: International Search Report and Written Opinion dated Oct. 25, 2016, 15 pages.
Lu, G. and Russell, P. "M2M Service Session Usage Scenario Call Flow Examples", OneM2M Contribution, ARC-2013-455, Oct. 6, 2013, 11 pages.
Lu, G., "M2M Session Management", OneM2M Contribution, ARC-2013-334R02, Aug. 6, 2013.
OneM2M "Functional Architecture" TS-0001-V1 .6.1, Technical Specification, Jan. 30, 2015, 321 pages.
OneM2M "Introduction to Service Session Management", ARC-0588R01, Nov. 13, 2013, 12 pages.
OneM2M "M2M Service Session Management (SSM) CSF", ARC-0498R01, Oct. 6, 2013, 18 pages.
OneM2M "M2M Service Session Management (SSM) CSF", ARC-0589R01, Nov. 13, 2013, 15 pages.

(Continued)

Primary Examiner — Brian Whipple
(74) Attorney, Agent, or Firm — BakerHostetler

(57) ABSTRACT

Methods, system, and apparatuses may support end-to-end (E2E) quality of service (QoS) through the use of service layer (SL) sessions. For example, an application can communicate with a targeted device based on application specified schedule, latency, jitter, error rate, throughput, level of security, and cost requirements.

12 Claims, 27 Drawing Sheets

(56) References Cited

OTHER PUBLICATIONS

OneM2M "OneM2M Functional Architecture Baseline Draft", TS-0001-V-1.1.0, Aug. 9, 2014, 367 pages.
OneM2M "Service Session Management (SSM) CSF Resources", oneM2M Contribution, ARC-2013-0563-SSM, Nov. 13, 2013, 7 pages.
OneM2M, "Session Management CSF Resources" OneM2M Contribution, ARC-2013-0454, Oct. 6, 2013, 12 pages.
Open Networking Foundation, OpenFlow Switch Specification, V-1.3.4, Mar. 27, 2014, https://www.opennetworking.orgja/sdn-resources-ja/onf-specifications/openflow.
Open Networking Foundation, OpenFlow Table Type Patterns Version No. 1.0, Aug. 15, 2014, 55 pages, https://www.opermetworking.orgja/sdn-resources-ja/onf-specifications/openflow.

Attributes for oneM2M <sessionPolicy> Resource

| Attribute Name | Multiplicity | RW/RO/WO |
|---|---|---|
| schedule | 0..1 | RW |
| latency | 0..1 | RW |
| throughput | 0..1 | RW |
| jitter | 0..1 | RW |
| errorRate | 0..1 | RW |
| costLevel | 0..1 | RW |
| securityLevel | 0..1 | RW |

INTERNET OF THINGS END-TO-END SERVICE LAYER QUALITY OF SERVICE MANAGEMENT

CROSS-REFERENCE TO RELATED APPLICATIONS

This application is a continuation of U.S. patent application Ser. No. 17/361,388 filed Jun. 29, 2021, which is a continuation of U.S. patent application Ser. No. 15/228,239 filed Aug. 4, 2016 which claims the benefit of U.S. Provisional Patent Application No. 62/200,752, filed on Aug. 4, 2015, entitled "Internet of Things End-to-End Service Layer Quality of Service Management," the contents of which are hereby incorporated by reference herein.

BACKGROUND

M2M/IoT SL

An M2M/IoT Service Layer (SL) is a technology specifically targeted towards providing value-added services for M2M/IoT devices and applications. Recently, several industry standard bodies (e.g., oneM2M Functional Architecture-V-1.6.1 and ETSI TS 102 690 Machine-to-Machine communications (M2M) Functional architecture V2.0.13) have been developing M2M/IoT SLs to address the challenges associated with the integration of M2M/IoT devices and applications into deployments with the Internet/Web, cellular, enterprise, and home network.

A machine-to-machine/internet of things (M2M/IoT) service layer (SL) may provide access to a collection of M2M/IoT oriented capabilities. A few example capabilities include security, charging, data management, device management, discovery, provisioning, and connectivity management. See oneM2M-TS-0001, oneM2M Functional Architecture-V-1.6.1, which is incorporated by reference in its entirety. Capabilities may be made available to applications via application programming interfaces (APIs) which make use of message formats, resource structures, and resource representations supported by the M2M/IoT SL.

FIG. 1 illustrates an exemplary protocol stack that may support a service layer. From a protocol stack perspective, SL 101 may be situated above application protocol layer 102 and application layer 103 below and may provide value added services to supported applications. SL 101 may be categorized as 'middleware' services.

Sessions

A communication session typically involves a persistent interactive exchange of information between two or more communicating entities (e.g., devices, applications, etc.). A communication session is established at a certain point in time, and torn down at a later point in time based on various circumstances (e.g., after the session times out or when one of the entities decides to terminate the session). A communication session may involve the exchange of multiple messages between entities and may be stateful. Stateful may mean that at least one of the communicating entities saves information about the session history in order to be able to maintain the communication session (e.g., connectivity, registration, security, scheduling, and data that is applicable to the session participants). Communication sessions may be implemented as part of protocols and services at various layers in a network protocol stack. As an example, FIG. 2 illustrates communication sessions established between network node 104 and network node 105. The communication sessions of the aforementioned network nodes 104 and 105 may be based on the transport protocol layer 110 (e.g., TCP connection), session protocol layer 109 (e.g., TLS and DTLS sessions), web transport protocol layer 108 (e.g., HTTP and CoAP sessions), M2M/IoT SL 107 (e.g., oneM2M sessions), and application-specific sessions 106.

A conventional application session is a communication session between two or more applications that is established and managed by the applications themselves rather than by an underlying communication protocol or service layer. As a result, application sessions can add extra overhead and complexity to applications. For example, a conventional application session may require applications to configure, establish, and manage sessions themselves. This can involve creation and management of session context such as credentials, identifiers, routing information, discovery information, location, transaction history, and data.

A M2M/IoT SL session is a communication session that is facilitated by the value-added session management services supported by a SL. These services can include capabilities such as mechanisms for establishing a SL session between SL endpoints as well as collecting and maintaining context pertinent to the SL session and its endpoints. A SL session can be established between two or more SL session endpoints where these endpoints may be applications or SL instances. At a minimum however, at least one instance of a SL must participate in the session to function as the facilitator of the SL session (e.g., provide the necessary SL session management functionality). A 'SL instance' may be considered a single instantiation of a service layer (e.g., a service layer hosted on a device). A 'SL session' is a communication session between a SL and an application. A SL can support multiple simultaneous SL sessions.

FIG. 3 illustrates examples of M2M/IoT SL sessions. In a first example, at 112, a SL session is established between a single application and a SL instance. This is an example of a 0-hop SL session since it does not span across a SL instance. The second example, at 113, shows a SL session established between two SL instances. This is another example of a 0-hop SL session. The third example, at 114, shows a SL session established between two applications spanning across common SL instance 117, hence this is an example of a 1-hop SL session. The fourth example, at 115, shows a M2M SL session established between three applications spanning across two SL instances (SL instance 116 and SL instance 117) and is an example of a 2-hop SL session.

One benefit of M2M/IoT SL sessions is they can be used to offload applications from the burden of having to establish and maintain their own application-based sessions. This is because a SL session differs from an application session in that, the brunt of the overhead involved with establishing and maintaining the session is offloaded to the SL such that applications are not burdened with this responsibility. Some examples of overhead that may be offloaded to the SL can include creation and management of session context such as credentials, identifiers, routing information, discovery information, location, transaction history, and data.

A SL session may be layered on top of one or more underlying transport or access network communication sessions (which may also be called connections, herein). Some examples may include web transport protocol sessions (e.g., HTTP session), session layer sessions (e.g., a transport layer session (TLS)), transport layer connections (e.g., transmission control protocol (TCP)), underlying access network connections (e.g., 3GPP, broadband Ethernet, Wi-Fi, Bluetooth). This layering allows a SL session to support persistency with regards to lower layer sessions such that the SL session can persist and be maintained independent of the setup and tear down of lower layer sessions. For example, a SL session can persist in spite of its underlying TCP or TLS sessions being repeatedly setup and torn-down which is fairly typical during the course of normal network communication (e.g., due to power saving methods and mobility).

The establishment of a M2M/IoT SL session between session participants may be initiated as part of the SL registration process or as a separate process thereafter. Once established, a SL session may be used to collect and maintain SL context pertaining to the session participants and the communication that takes place between them. For example, SL session context such as registration state and security credentials of session participants, subscription criteria and contact information for session participants, session participant data stored in SL resources, history of transactions performed by session participants may be collected and maintained for each session. The termination of a SL session between session participants may be initiated as part of the SL de-registration process or as a separate process performed before de-registration takes place.

A noteworthy point to highlight is that the establishment of a SL session as well as the accumulation of SL session context during the lifetime of a particular SL session may involve a significant amount of time and effort on behalf of the session participants. Hence the persistent nature of a SL session is one of its major value-added differentiators compared to lower layer transport and access network sessions which lack this persistency. A persistent SL session may be used to maintain SL session context on behalf of application such that they do not have to maintain this information themselves. In addition when a lower layer session is torn down the SL session context may persist and when the lower layer connection is re-established, this context will still be available to an application. Hence this context can be maintained independent of non-persistent underlying transport sessions or access network connections. Some examples of SL session context may include SL registrations, subscriptions, credentials, identifiers, charging records, routing information, discovery information, location, transaction history, and data for applications.

oneM2M SL Architecture

The oneM2M standard (oneM2M Functional Architecture) under development defines a service layer called common service entity (CSE), as illustrated in FIG. 4. The Mca reference point interfaces with an application entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. CSE contains multiple logical functions called "Common Service Functions (CSFs)", such as "Discovery" or "Data Management & Repository." FIG. 5 illustrates example CSFs for oneM2M.

oneM2M architecture enables the application service node (ASN), application dedicated node (ADN), the middle node (MN), and the infrastructure node (IN). The ASN is a node that contains one CSE and contains at least one AE. An example of physical mapping is an ASN residing in an M2M Device. The ADN is a node that contains at least one AE and does not contain a CSE. An example of physical mapping is an ADN residing in a constrained M2M Device. An MN is a node that contains one CSE and contains zero or more AEs. An example of physical mapping for an MN is an MN residing in an M2M Gateway. The IN is a node that contains one CSE and contains zero or more AEs. An example of physical mapping for an IN is the IN residing in an M2M Service Infrastructure. There also may be a non-oneM2M node, which is a node that does not contain oneM2M Entities (neither AEs nor CSEs). Such nodes represent devices attached to the oneM2M system for interworking purposes, including management. The possible configurations of inter-connecting the various entities supported within the oneM2M system are illustrated in FIG. 6.

oneM2M in TS-0001, oneM2M Functional Architecture, Version 1.1.0, August 2014 has defined a service layer session management service (e.g., SSM CSF 119), as shown in FIG. 5. oneM2M has also defined a SL session as an end-to-end SL connection managed by the SSM CSF. oneM2M has also defined some requirements of the SSM CSF however it has not yet defined the architecture nor design that meet these requirements. For example, oneM2M states that the Session Management service shall support the following features:

1) SSM CSF shall support requests to establish an SL session between AEs, between an AE and a CSE, or between CSEs.
2) The SSM CSF shall support SL sessions that span multiple transit CSE hops.
3) Before a request to establish an SL session is granted, the SSM CSF shall first authenticate the requester using pre-established credentials
4) The SSM CSF shall use the SEC CSF to support end-to-end authentication. Once authenticated, the SSM CSF shall establish the M2M SL between the requesting and targeted session endpoints
5) The SSM CSF shall return session ID to the requester.
6) The SSM CSF shall also maintain additional session information for the management of the session such as session policies, session routing information, session descriptor, etc.
7) The SSM CSF shall support requests to terminate an SL session between AEs, between an AE and a CSE, or between CSEs.
8) The SSM CSF shall support layering of a SL session over the top of underlying network (UN) connections and the SSM CSF shall support persistency of the SL sessions with respect to the underlying network connections.
9) The SSM CSF shall maintain an active SL session independent of the state of the underlying network connections and shall be robust to network connections that are dynamically torn-down and re-established.
10) The SSM CSF shall support initiating or providing input to other CSFs and/or the underlying network on whether the network connections should be torn-down/re-established based on SL session activity or state oneM2M has yet to define functionality of the SSM CSF to support the requirements defined above. Generally, proposed implementations that have been submitted as contributions to oneM2M focus on defining SSM resource definitions and procedures to support requirements 1 thru 7 above. FIG. 7 illustrates an example resource structure for oneM2M SL session management. A <session> resource contains attributes and sub-resources for managing an individual SL session.

oneM2M defines a schedule child resource type that can be used to store scheduling information for a limited set of parent resource types which include CSEBase, remoteCSE, subscription, or cmdhNwAccessRules. As a result, oneM2M supports the following types of scheduling:
1) A CSE can define its reachability schedule by supporting a schedule child resource under its CSEBase or remoteCSE parent resource. In doing so, a CSE can declare the times when it is available to send or receive SL requests.

2) A subscriber (e.g., application) of a CSE resource can define a notification schedule which controls the times when a CSE sends it notifications. A subscriber can do this by creating a schedule child resource under a subscription resource.

3) A CSE can support an access network schedule which defines when the CSE is able to access a particular underlying access network. This is done by creating a <schedule> child resource under a <cmdhNwAccessRules> resource.

The oneM2M schedule resource supports a scheduleEntry attribute. This attribute defines a schedule that is formatted using a string consisting of 6 comma separated fields as shown in Table 1. Each field can be either an asterisk '*' (indicating it matches any value), a number (indicating it matches a specific value), or two numbers separated by a hyphen '-' (indicating it matches a range of values).

For example, a scheduleEntry having a string value of '0-30, 30, 12, 1, *, *' translates into a schedule where seconds has a value of '0-30', minutes '30', hour '12', Day of the month '1', month of the year and day of the week '*'. For example, if this scheduleEntry was used for a subscription schedule, then this would result in the CSE only sending corresponding notifications to a subscriber on the 1$^{st}$ day of each month starting at 12:30 and for a window of 30 seconds. During all other times, the CSE would buffer notifications waiting for the next subscription schedule window to start.

TABLE 1

Definition of scheduleEntry string format

| Field Name | Range of values | Note |
| --- | --- | --- |
| Second | 0 to 59 | |
| Minute | 0 to 59 | |
| Hour | 0 to 23 | |
| Day of the month | 1 to 31 | |
| Month of the year | 1 to 12 | |
| Day of the week | 0 to 6 | 0 means Sunday |

3GPP Service Capability Exposure Function (SCEF)

FIG. 8 illustrates an exemplary 3GPP service capability exposure function (SCEF)-based system architecture. 3GPP has recently defined a framework to better expose underlying 3GPP network capabilities to application/service providers. See 3GPP TS 23.682, Architecture Enhancements to Facilitate Communications with Packet Data Networks and Applications, V13.0.0, which is incorporated herein. In order to achieve this, 3GPP has defined the SCEF. The SCEF function provides a means to securely expose the services and capabilities provided by 3GPP networks. The SCEF provides a means for the discovery of the exposed service capabilities. The SCEF provides access to network capabilities through homogenous network application programming interfaces (e.g., network API) defined by OMA, GSMA, and possibly other standardization bodies. The SCEF abstracts the services from the underlying 3GPP network interfaces and protocols.

SUMMARY

Disclosed herein are methods, systems, and apparatuses that enable applications to perform end-to-end communication with targeted M2M/IoT devices in a manner which meets their E2E QoS requirements. For example, an application can communicate with a targeted device based on application specified schedule, latency, jitter, error rate, throughput, level of security, and cost requirements.

Specifically, this disclosure defines the below. First, a system for M2M/IoT E2E SL QoS Management that supports methods/procedures to allow an application to establish, use, and teardown an M2M/IoT SL communication session that has application specified QoS preferences and that targets one or more SL addressable targets (e.g., an M2M/IoT application, device, or gateway SL addressable resource).

Second, an E2E SL Session based methods/procedures to allow a M2M/IoT SL to interact with underlying networks to configure, select, and/or influence the underlying network QoS level based on application specified E2E QoS preferences. The underlying transport network (that interconnects two service layer nodes with one another) may be configured by the service layer with the quality of service requirements specified by the application.

Third, methods/procedures to allow an UN to share UN QoS and connectivity related information with M2M/IoT SLs such that SLs can make informed decisions as to which UNs to use for different E2E SL Sessions.

Fourth, E2E SL Session based methods/procedures to allow M2M/IoT SL instances to coordinate E2E QoS for a multi-hop communication path spanning across multiple underlying network technologies and/or operators. Where these methods involve coordinating E2E reachability schedules of multiple SL instances and applications, budgeting of latency and jitter across multiple underlying network hops, and ensuring minimum throughput, targeted cost, and required security levels are also achieved.

Fifth, definition of E2E SL Session QoS information that can be exchanged between SL instances, applications and UNs to enable the E2E alignment of UN QoS parameters such as connectivity schedule, throughput, latency, jitter, cost, security levels and error rates between SL entities needing to communicate with one another.

Sixth, a system level oneM2M and 3GPP example of the proposed M2M/IoT E2E SL QoS Management system.

Seventh, API level examples of the proposed SLCM, ACM and UNCM functions.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EXAMPLES

Disclosed herein are methods, system, and apparatuses that support end-to-end (E2E) quality of service (QoS) through the use of service layer (SL) sessions.

Figure 1:
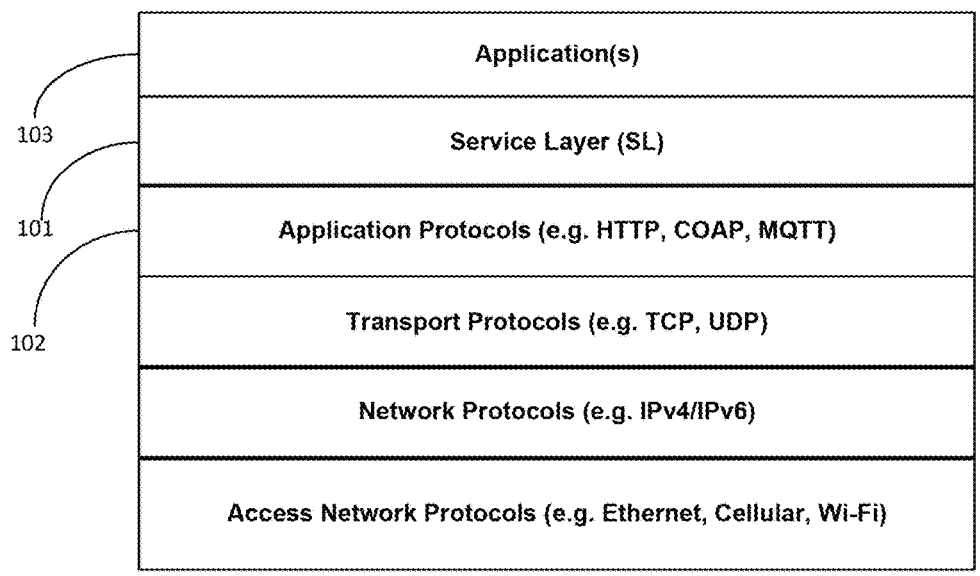
FIG. 1 illustrates an exemplary Protocol Stack Supporting a Service Layer.
Figure 2:
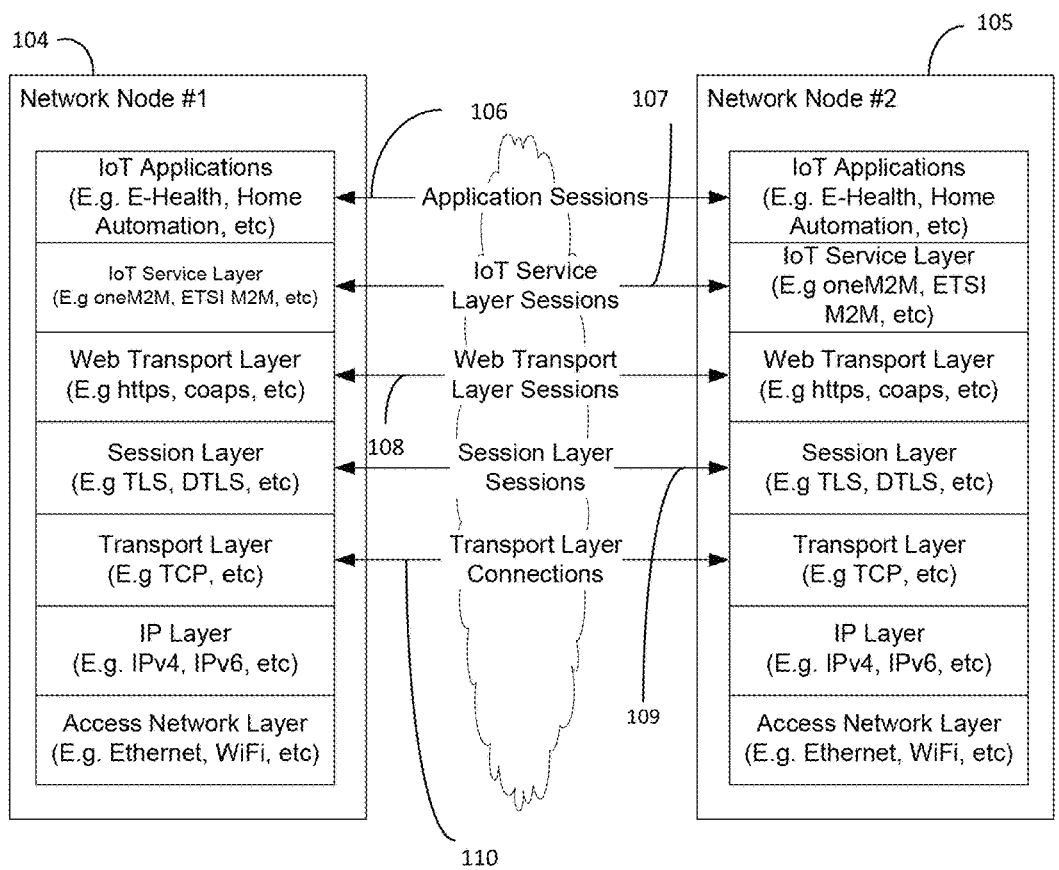
FIG. 2 illustrates exemplary communications sessions.
Figure 3:
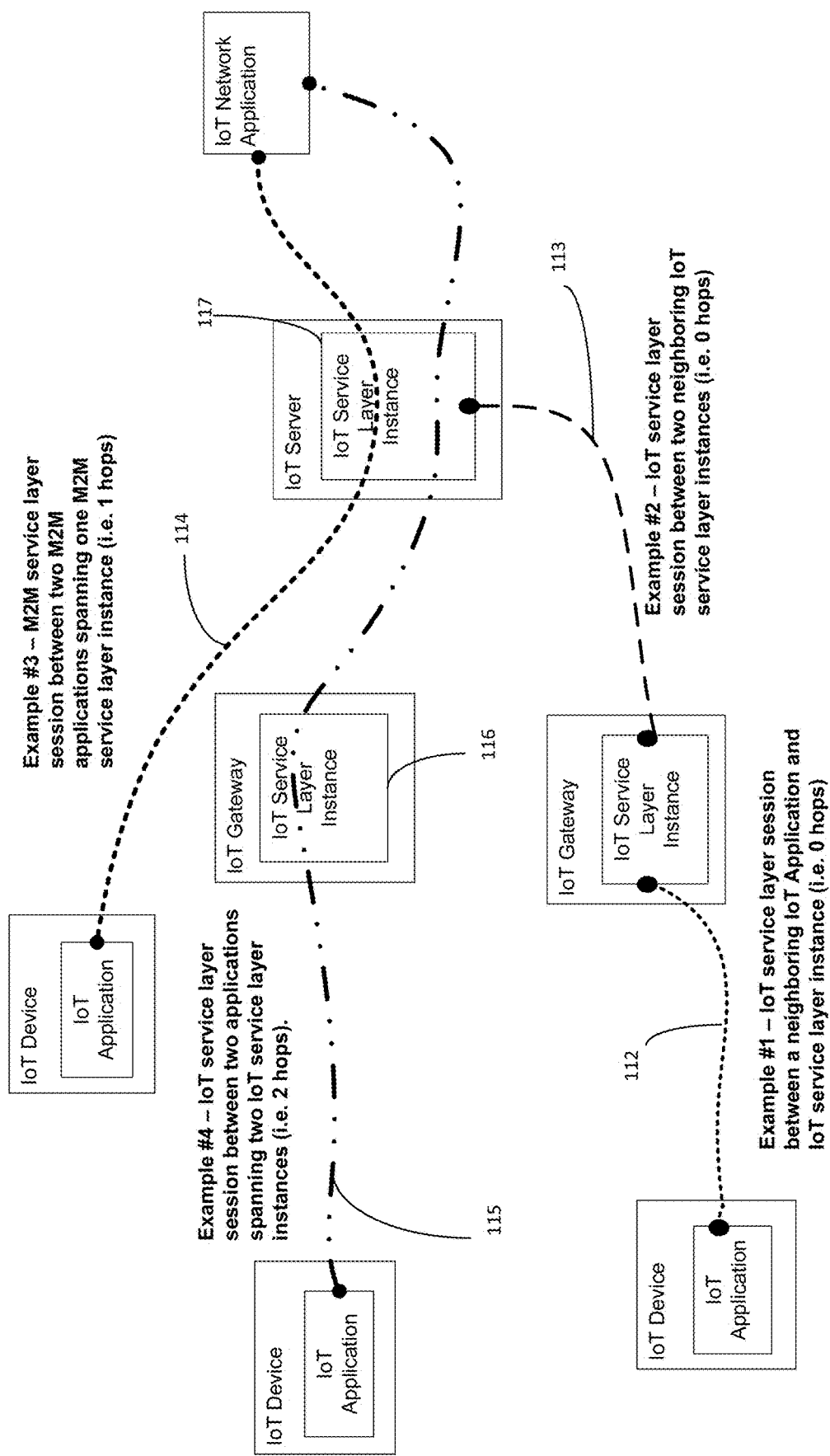
FIG. 3 illustrates exemplary IoT SL Session.
Figure 4:
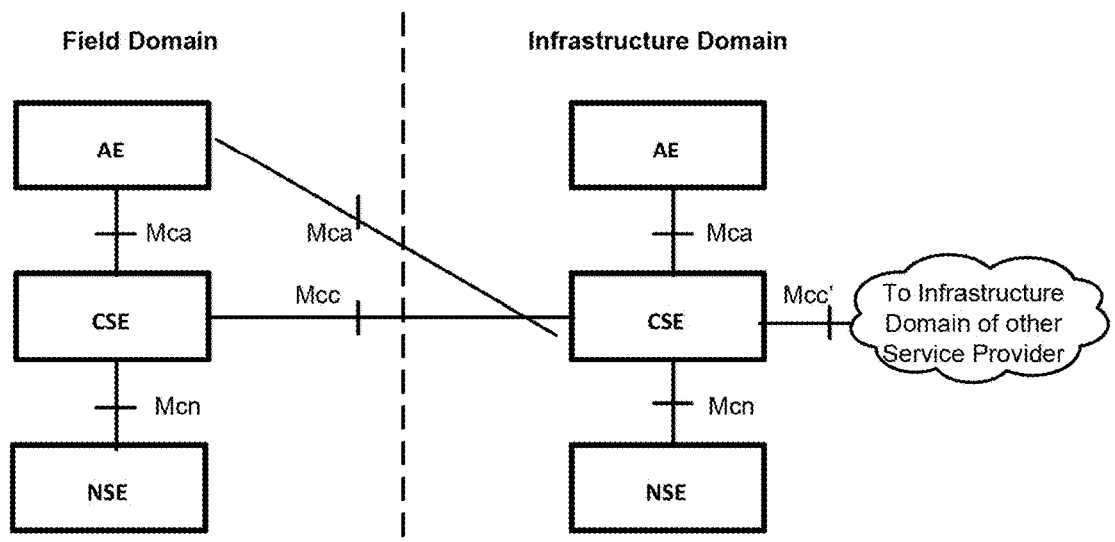
FIG. 4 illustrates an exemplary oneM2M Architecture.
Figure 5:
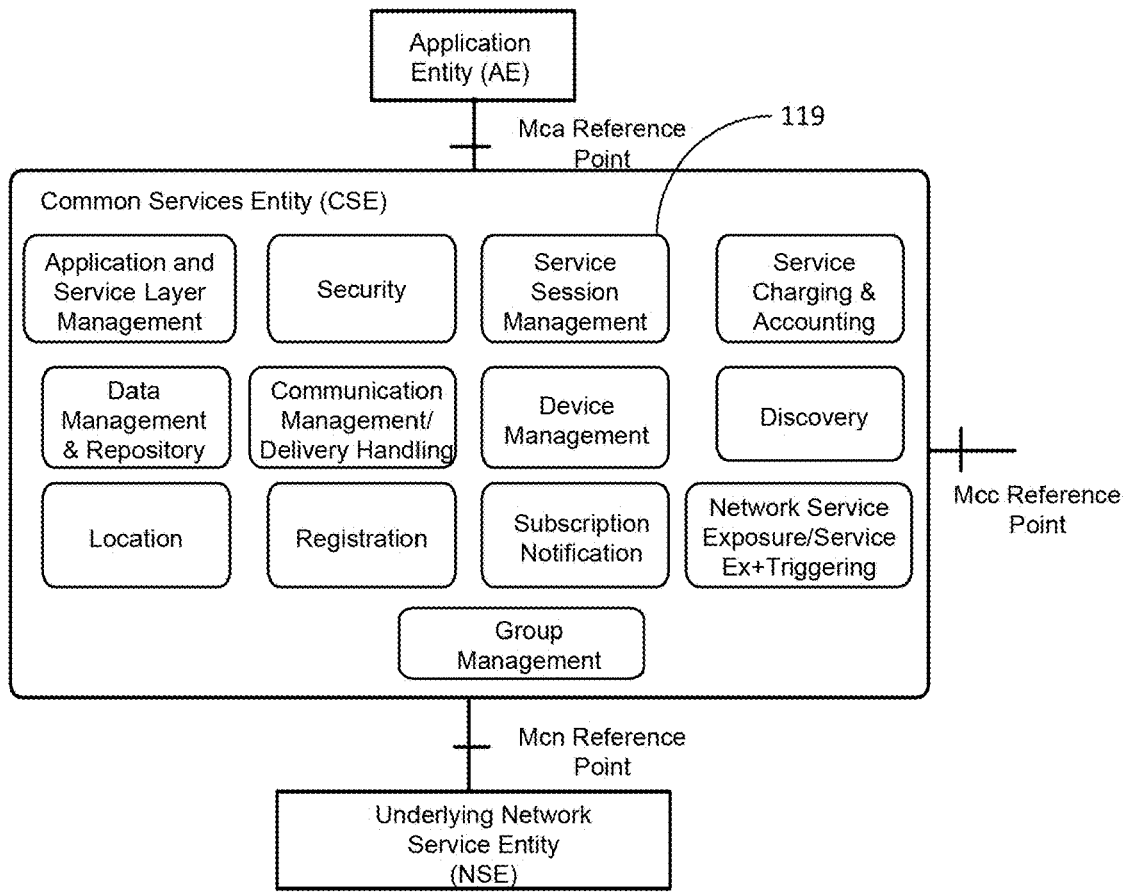
FIG. 5 illustrates an exemplary oneM2M Common Service Functions.
Figure 6:
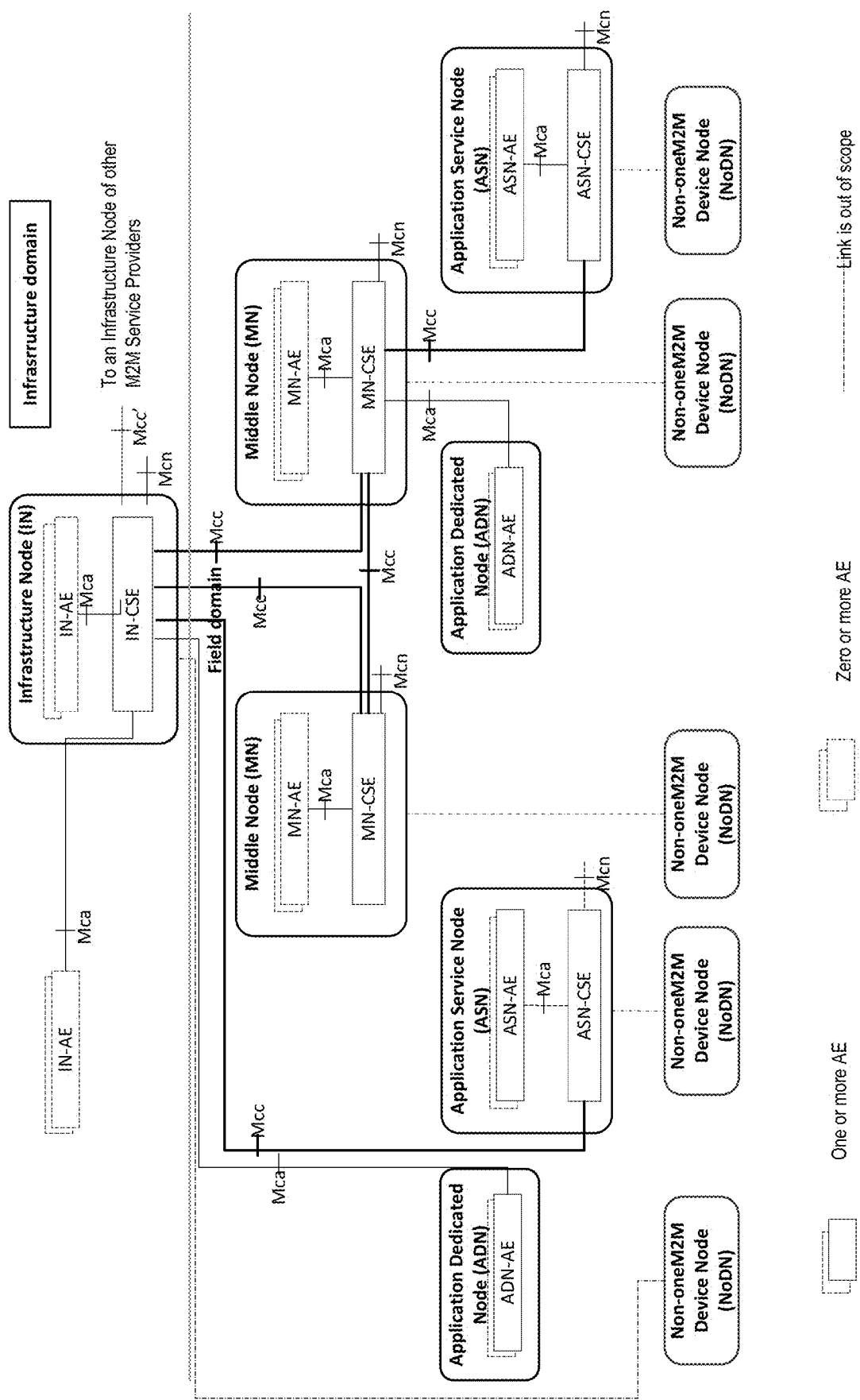
FIG. 6 illustrates exemplary Configurations supported by oneM2M Architecture.
Figure 7:
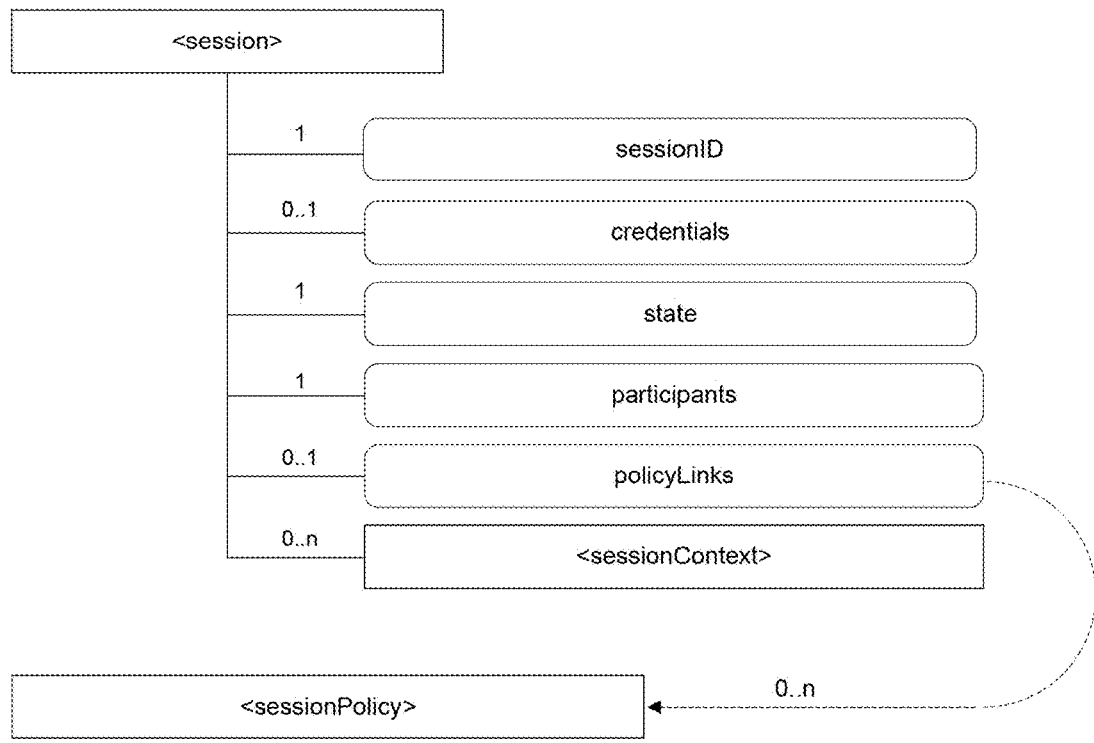
FIG. 7 illustrates exemplary resource structure for oneM2M SL Session Management.
Figure 8:
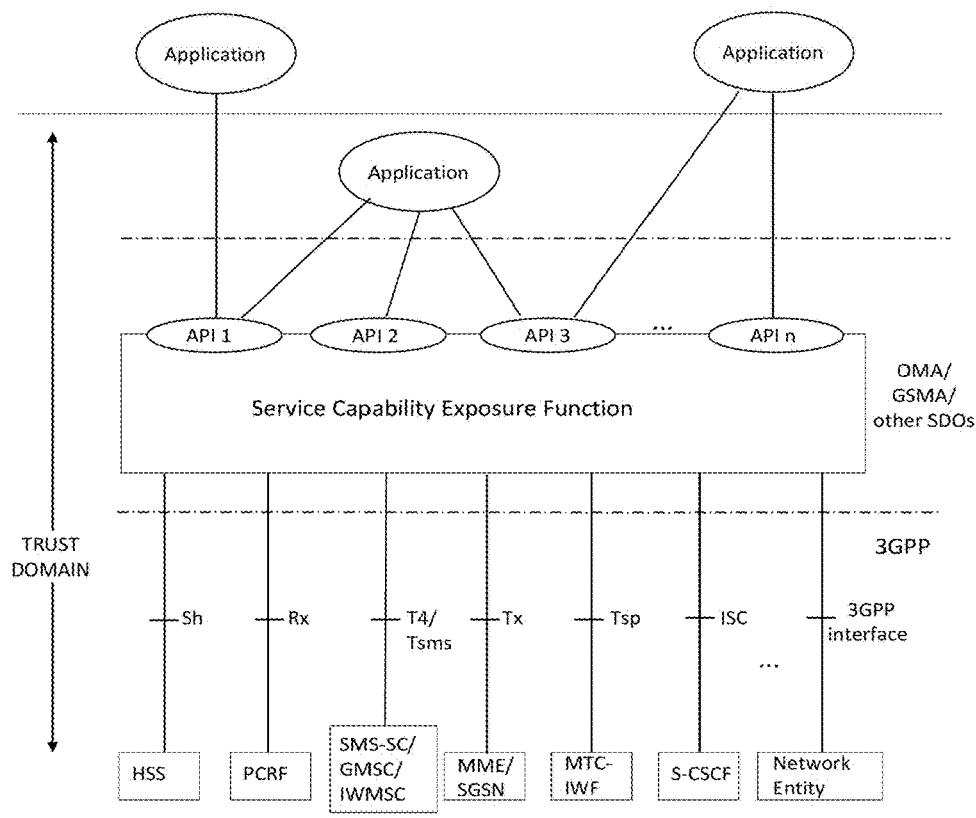
FIG. 8 illustrates an exemplary 3GPP SCEF-based System Architecture.
Figure 9:
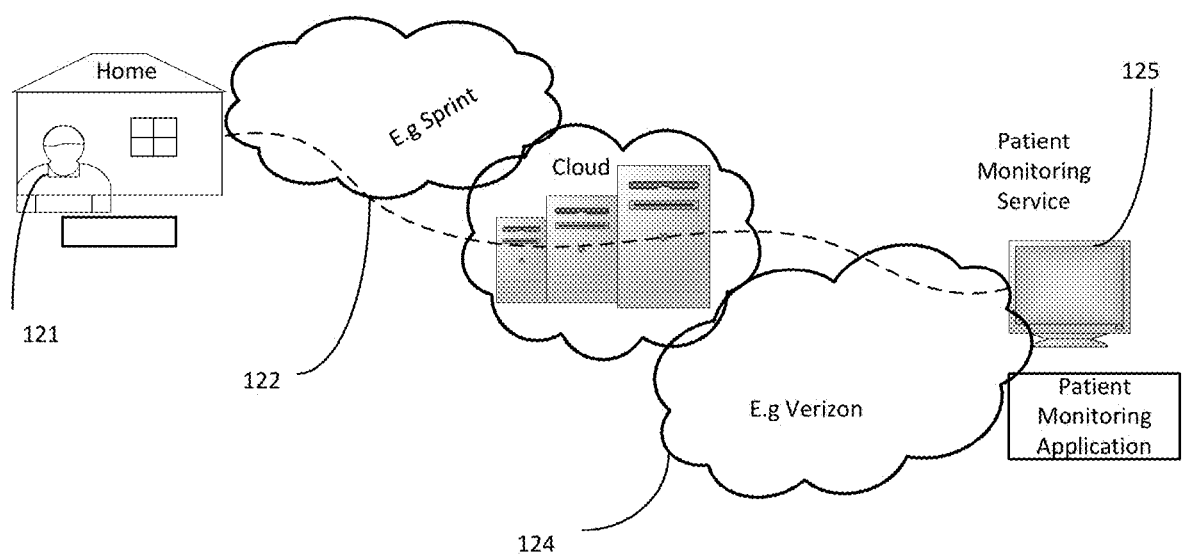
FIG. 9 illustrates an exemplary End-to-End IoT Device Communication Use Case.

FIG. 9 illustrates a use case where an application may require E2E communication with a specific M2M/IoT device application across a wide area network. There may be sensors 121 that are communicatively connected with patient monitoring application 124 via a first underlying network 122 and a second underlying network 124. Depending on the type of application and the type of device, this communication may have specific E2E QoS requirements. Examples are provided below. In a first example scenario, a physician contracts with an in-home patient monitoring service to monitor one of his patients remotely. The service makes use of patient monitoring application 125 that establishes an end-to-end communication session with sensors 121 (e.g., wearable medical sensors) situated on a patient's body. To properly monitor this patient's condition, the physician requests that the service obtain measurements (e.g., patient's blood glucose level) from the sensors 121 every hour on the hour to properly assess whether the patient is taking his medication (e.g., insulin) and whether it is having the desired effect. If abnormal measurements are detected the service may notify the physician or family members accordingly.

With continued reference to FIG. 9, similar to the first example scenario, in a second example scenario, an in-home patient monitoring service may be used to remotely monitor a second patient. To properly monitor this second patient's condition, a physician may request that the service monitor for alerts that may be generated from sensors 121 of the patient when a critical event is detected (e.g., patient's pulseOx reaching a critical threshold). For this particular patient, the physician requests that the service ensure that for any alert the end-to-end latency from the sensor 121 to the monitoring application 125 have less than 5 seconds of delay so that the service can then take appropriate actions. Appropriate actions may include notifying the physician or emergency medical services.

With continued reference to FIG. 9, similar to the first example scenario, in a third example scenario, the same in-home patient monitoring service is used by the physician to remotely monitor a third patient. To properly monitor this particular patient's condition, the physician requests that the service monitor the patient via video surveillance to detect and track the patient's physical activity. For the third patient, the physician may request that the service ensure surveillance is done with a live video feed requiring a minimum sustained end-to-end throughput of 5 Mbps.

M2M/IoT (interchangeably referred to herein as M2M or IoT) deployments that direct communication between applications, which may be backend applications, and deployed devices (e.g., sensors 121) in the field may not be the best implementation. Sensors 121 may be resource constrained and may not be able to effectively support their own wide area network connectivity. Sensors 121 may be unable to support maintaining persistent and active network connections that can strain resource limits (e.g., battery). For these reasons, many M2M/IoT devices rely on M2M/IoT gateways and servers for value added services, such as providing the device with wide area network connectivity and data storage services so that data can be accessed during periods when the device loses connectivity to the network. As a result, this E2E communication can traverse multiple underlying access network technologies (e.g., 3GPP, Broadband Ethernet, Wi-Fi, etc.) that may also be owned by different network providers (e.g., Sprint, Verizon, etc.). Disclosed herein are methods, system, and apparatuses that support end-to-end (E2E) quality of service (QoS) through the use of service layer (SL) sessions. In the first release of the oneM2M specifications, the following QoS centric requirements have been specified, however corresponding solutions have not yet been defined in the oneM2M architecture or protocol specifications:

The oneM2M System shall support the inclusion of M2M Application's QoS preference in service requests to underlying networks.

The oneM2M System shall be able to authorize service requests with QoS preference at service level, but shall pass M2M Application's QoS preference in service requests to underlying network for authorization and granting or negotiation of the service QoS requests.

The oneM2M System shall be able to support different QoS-levels specifying parameters, such as guaranteed bitrate, delay, delay variation, loss ratio and error rate, etc.

The oneM2M System shall be able to receive and utilize information provided by the underlying network about when an M2M Device can be reached.

When available from the underlying network, the oneM2M System shall be able to maintain the M2M Service Operational Status of a M2M Device and update it when the underlying network connectivity service status changes.

QoS protocols and IoT SL technologies have the following possible shortcomings with regards to supporting use cases like the one discussed with regard to FIG. 9 in view of the QoS centric requirements of the oneM2M specification. A first possible short coming is that QoS protocols, such as Differentiated Services (DiffServ) and Integrated Services (IntServ), are not suitable for supporting E2E QoS management within many IoT network deployments. Both DiffServ and IntServ require network routers to maintain state for each communication flow. This state requires resources (e.g., memory, MIPS, etc.) that many IoT routers do not usually have available. Both DiffServ and IntServ require periodic communication between routers to share and maintain QoS related control information. This extra messaging overhead is not suitable for many IoT networks. Many IoT networks involve E2E communication paths spanning across different types of underlying access networks (e.g., 3GPP, Broadband Ethernet, Wi-Fi, 6LoWPAN, etc.) and operated by different network providers. For the reasons mentioned herein, some of the networks are not well equipped to support DiffServ and IntServ. DiffServ and IntServ deployments can often differ from one operator's network to another (e.g., different router policies, different levels of support for DiffServ and IntServ protocols and features). Therefore it is common that DiffServ and IntServ are only used within an individual operator's network rather than across operator networks. Lastly, DiffServ and IntServ protocols do not support features such as reachability scheduling which is critical in many IoT networks since devices do not maintain persistent network connectivity.

A second possible shortcoming, conventional IoT SL technologies lack methods to allow an application to define E2E QoS requirements (e.g., schedule, latency, jitter, error rate, throughput, level of security and cost) which meet the needs of an application use case.

A third possible shortcoming, conventional IoT SL technologies also lack methods to properly manage E2E communication which span over multiple underlying networks that can potentially be of different technology types (e.g., 3GPP and Broadband Ethernet) or owned and operated by different network operators (e.g., Sprint and Verizon).

Figure 10:
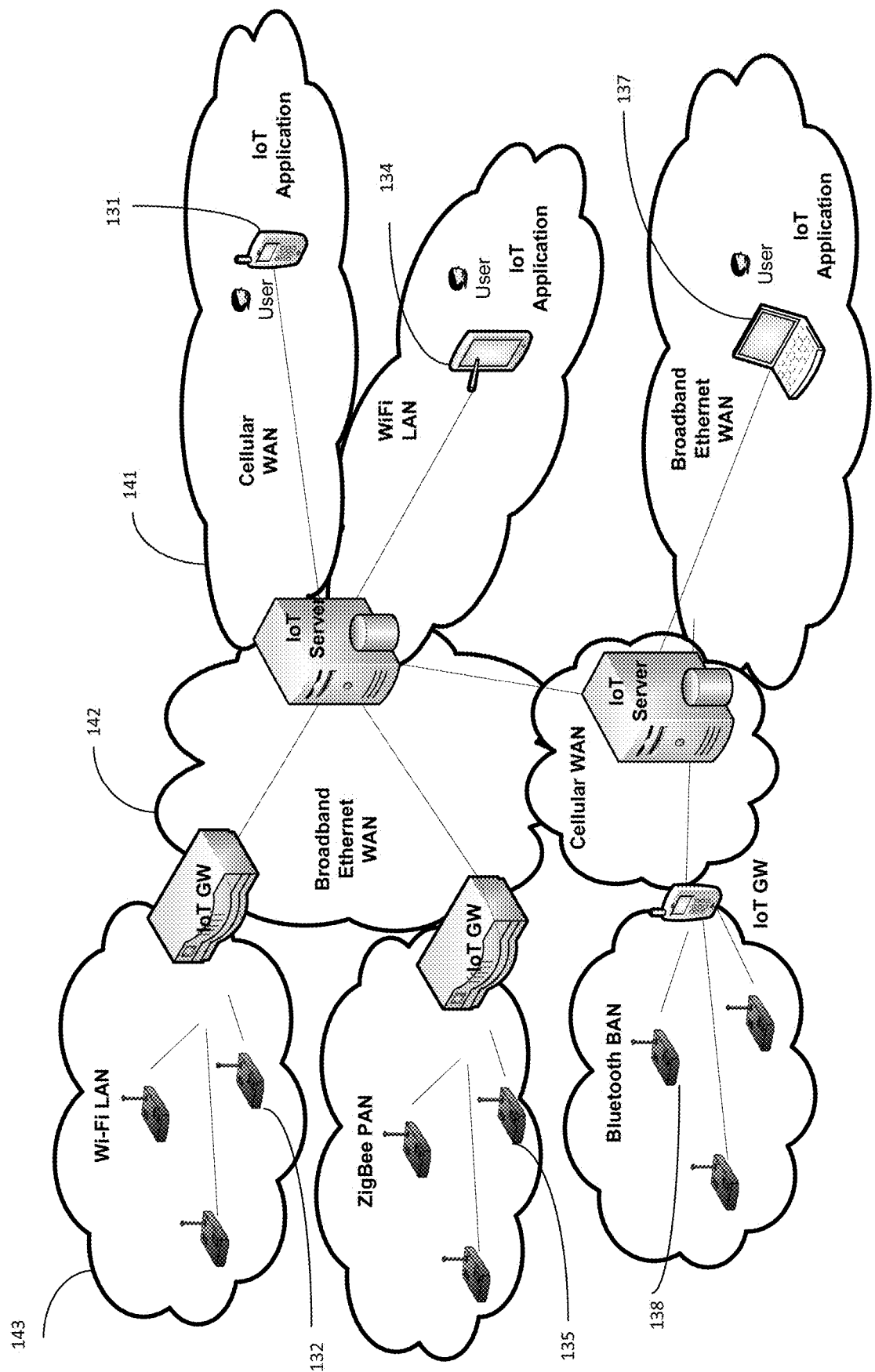
FIG. 10 illustrates an exemplary End-to-End Communication Involving Different Access Networks.

With reference to the aforementioned shortcomings, FIG. 10 illustrates a typical IoT network consisting of E2E communication paths spanning across multiple underlying access network technology hops which together inter-connect devices with backend applications. For example, E2E communication between application 131 and device 132 involves communication across three different access network technology hops, such as cellular 141, broadband Ethernet 142, and Wi-Fi 143. Similar examples are also shown with regard to communication over multiple networks for E2E communication, such as communication between application 134 and device 135, as well as communication between application 137 and device 138.

Below are examples of possible issues related to network deployments like the deployment captured in FIG. 10. In a first example, conventional IoT SL technologies lack the capability to adjust the reachability schedule of SL instances and their connectivity schedules to underlying networks (UNs) such that they are aligned with one another in a hop-by-hop manner as well as in an E2E manner to allow the E2E reachability schedule defined by an application to be met. As a result, mismatches in reachability schedules between SL instances can occur. When this happens, actions such as store-and-forward of messages can occur in the SL instances on a hop-by-hop basis (e.g., on IoT gateways and servers) while they wait for the next hop in the communication path to become reachable. In principle, store-and-forward delays are only a problem if they prevent an application from communicating with an IoT device in an E2E fashion per its required reachability schedule.

In a second example, conventional IoT SL technologies lack the capability to manage and adjust the communication latency of UNs they use for hop-by-hop interconnection. In addition they also lack capability to align their hop-by-hop latencies such that an E2E latency budget defined by an application can be met. As a result, management of E2E latency is a capability that is not supported by current IoT SL technologies. This prevents an application from communicating with an IoT device in an E2E fashion per a required latency budget.

In a third example, conventional IoT SL technologies lack the capability to manage and adjust the communication throughput of the UNs they use to for hop-by-hop interconnection with one another. In addition they also lack the capability to align their hop-by-hop throughput such that an E2E throughput defined by an application can be met. As a result, management of E2E throughput is a capability that is not supported by current M2M/IoT SL technologies. This prevents an application from communicating with a M2M/IoT device in an E2E fashion per a required throughput.

In a fourth example, conventional IoT SL technologies lack the capability to manage the E2E variation in delay between SL messages (e.g., the jitter) and in turn the capability to align their hop-by-hop jitter such that an E2E jitter budget defined by an application can be met. As a result, management of E2E jitter is a capability that is not supported by current IoT SL technologies. This prevents an application from communicating with a M2M/IoT device in an E2E fashion per a required jitter budget.

In a fifth example, conventional IoT SL technologies lack the capability to manage E2E messaging error rate. In addition they also lack the capability to manage their hop-by-hop messaging error rates such that an E2E error rate defined by an application can be met. As a result, management of E2E messaging error rates is a capability that is not supported by current M2M/IoT SL technologies. This prevents an application from communicating with a M2M/IoT device in an E2E fashion per a required messaging error rate.

The problems mentioned above become more likely as well as complex when an E2E communication path between an application and an M2M/IoT device spans multiple SL hops involving different types of UNs as well as when these UNs are owned/operated by different network operators. This is due to the fact that managing QoS in an E2E manner across different UNs requires coordination across the different network technologies which can be challenging to manage. Similarly managing QoS in an E2E manner across different operator networks requires coordination across these operators. As the number of SL hops, UNs, or different operators increase, the likelihood for problems increase.

Figure 11:
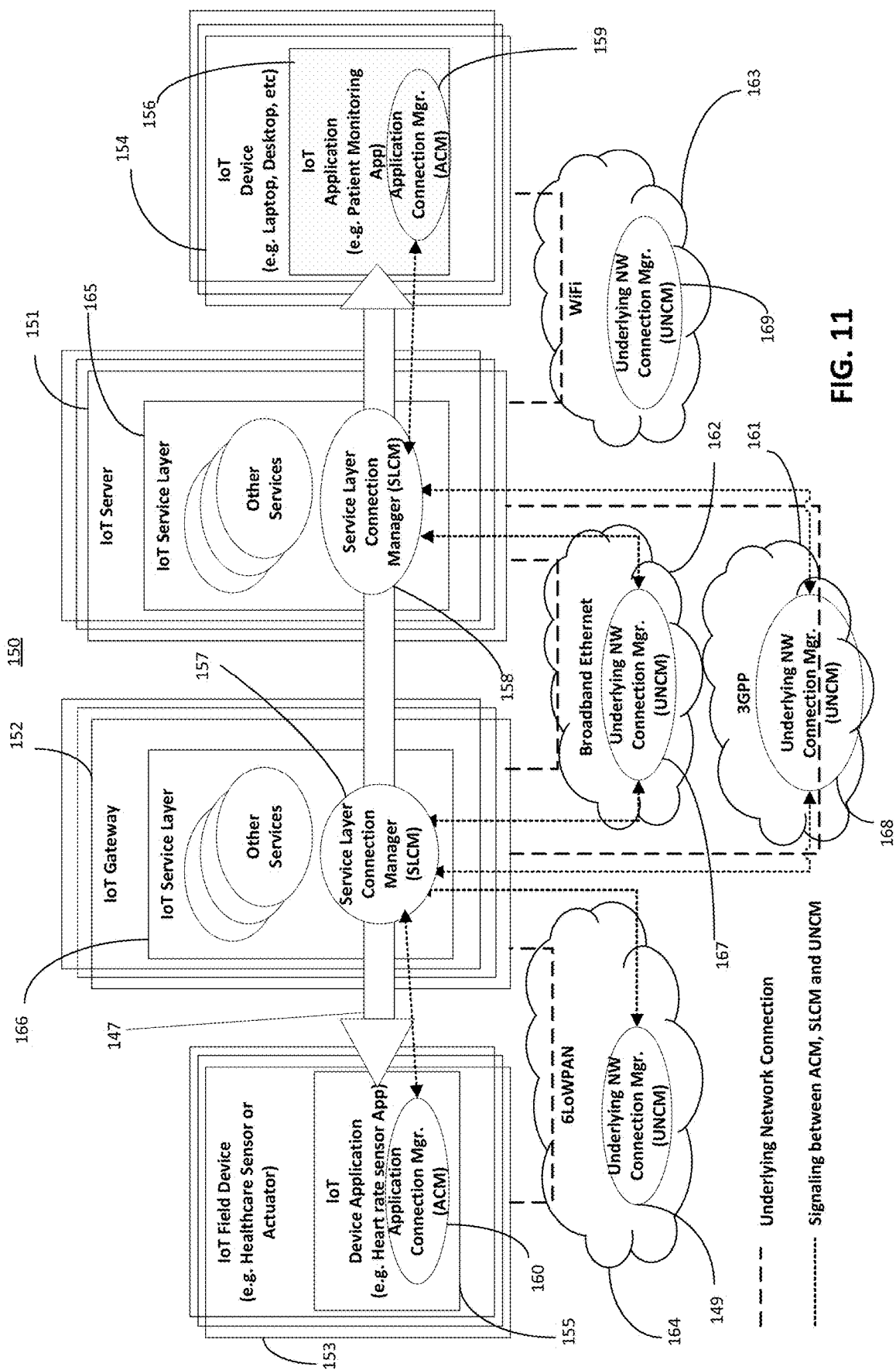
FIG. 11 illustrates an exemplary IoT System for Managing QoS for E2E Communication.

FIG. 11 illustrates an exemplary system 150 that supports mechanisms to manage QoS in an end-to-end fashion. System 150 may be used to support use cases, such as use cases that require application 156 to specify on-demand E2E QoS requirements. On-demand E2E QoS requirements may include reachability schedule, E2E latency, E2E throughput, E2E jitter, E2E error rate, E2E security level, or E2E cost of communication, among other things. System 150 includes IoT servers (e.g., IoT server 152), IoT gateways (e.g., IoT gateway 151), and devices (e.g., IoT field device 153 or IoT device 154) interconnected to one another via a diverse combination of local area and wide area UNs (e.g., 3GPP 161, broadband Ethernet 162, Wi-Fi 163, or 6LoWPAN 164). Hosted on the servers and gateways are instances of IoT SLs (e.g., IoT SL 166 or IoT SL 165). Hosted on the devices in the field as well as the devices in the backend are IoT applications (e.g., IoT device application 155 and IoT application 156) that communicate with one another. For example, E2E communication between a patient's IoT sensor or actuator and a backend patient monitoring application.

With continued reference to FIG. 11, system 150 includes a service layer connection manager (SLCM) function (e.g., SLCM 157 or SLCM 158), an application connection manager (ACM) function (e.g., ACM 159 or ACM 160) and an underlying network connection manager (UNCM) function (e.g., UNCM 167, UNCM 168, or UNCM 169). Together the SLCM, ACM, and UNCM functions may interact with one another to more intelligently manage and configure the end-to-end UN QoS and connectivity of IoT devices, gateways, servers, and applications in support of E2E QoS. Alternatively, a system may support just a subset of these functions. For example, a system can support just SLCM and UNCM functions and not ACM functions.

The SLCM function may be embedded within an IoT SL such as a oneM2M SL hosted on an IoT gateway or server platform. In another example, the UNCM function may be supported as a function within various types of underlying access network technologies such as 3GPP, Bluetooth, Wi-Fi, or broadband Ethernet.

SLCM 157 may allow IoT device application 155 to specify E2E SL session QoS requirements to IoT SL 152, for example. This may include an application specifying the required reachability schedule for one or more targeted endpoints (e.g., when the application requires that a targeted M2M/IoT device be reachable to service its SL requests). It can also include, an application specifying its required E2E latency budget (e.g., the overall round trip latency for SL requests and responses to travel between the application and targeted M2M/IoT device). It can also include an application specifying its E2E jitter budget (e.g., the acceptable variation in delay between consecutive SL messages that travel between the application and targeted M2M/IoT device). It can also include an application specifying its E2E error rate (e.g., the acceptable rate of errors when communicating E2E between the application and targeted M2M/IoT device). SLCM 157 may also include an application specifying its required E2E throughput (e.g., the throughput between the application and targeted M2M/IoT device).

Using this information, SLCM 157 may support analyzing the QoS requirements of its collective set of SL registrants (e.g., applications) and perform configuration of its SL instance on-the-fly such that the E2E QoS requirements for all its registrants are satisfied. To do this, SLCM 157 may perform on-the-fly adjustment of the reachability schedule, communication latency, communication jitter, error rate, communication throughput, level of security and cost for each of the SL hops in an E2E SL session's communication path. The exemplary E2E SL session 147 may be based on communication enabled via SLCM 157 and UNCM 167. In order to accomplish this, SLCM 157 may collaborate with UNCM functions hosted within one or more of the UNs that interconnect its SL instance with other SL instances. This collaboration may include SLCM 157 providing SL centric context information to UNCM 167, which may enable UNCM 167 to manage connections associated with its corresponding underlying access network. The context may include application (e.g., IoT device application 155) or SL (e.g., IoT SL 166) specified reachability schedule(s), application or SL specified maximum communication latency (single-hop and/or end-to-end), application or SL specified throughput (single-hop and/or end-to-end), application or SL specified jitter, application or SL specified error rate, level of security and cost.

ACM 160, for example, may be used by IoT device application 155 to determine E2E SL session QoS requirements of IoT device application 155. IoT device application 155 may then communicate these requirements to SLCM 157 hosted by its local IoT SL 166. ACM 160 may do this when setting up an E2E SL session. These requirements may include IoT device application 155 specific reachability schedule for one or more targeted endpoints, a required E2E latency budget, and a required E2E throughput, IoT device application 155 specified jitter, cost levels, security levels and IoT device application 155 specified error rate. ACM 160 may also communicate with UNCM 167 hosted by broadband Ethernet 167 (an underlying network) to share similar requirements.

UNCM 167, for example, may support functionality that enables SL instances to specify their UN QoS requirements such as connectivity schedule, latency, jitter, error rate, throughput, level of security and cost to a corresponding UN (e.g., broadband Ethernet 162). This information may then be used by broadband Ethernet 162, for example, to adjust UN configuration such that SL messages associated with a designated SL instance or a SL session may be processed by broadband Ethernet 162 in a manner that meets the SL defined requirements.

UNCM 167 may also be used by broadband Ethernet 162 to communicate UN centric information back up to SL instances (e.g., IoT SL 166). For example, UNCM 167 may provide information to SLCM 157 regarding a particular SL session (e.g., SL session 147). Sharing this information with SLCM 157 may enable UNCM 167 to more intelligently manage reachability schedules of applications and SL(s) as well as end-to-end communication. This information may include network congestion or changes in UN connectivity for a peer SL instance or application. For example, SLCM 157 may take a decision to switch from one UN (e.g., broadband Ethernet 162) to another UN (e.g., 3GPP 161) for SL session 147 based on congestion information of broadband Ethernet 167 provided to it by UNCM 167.

Figure 30A:
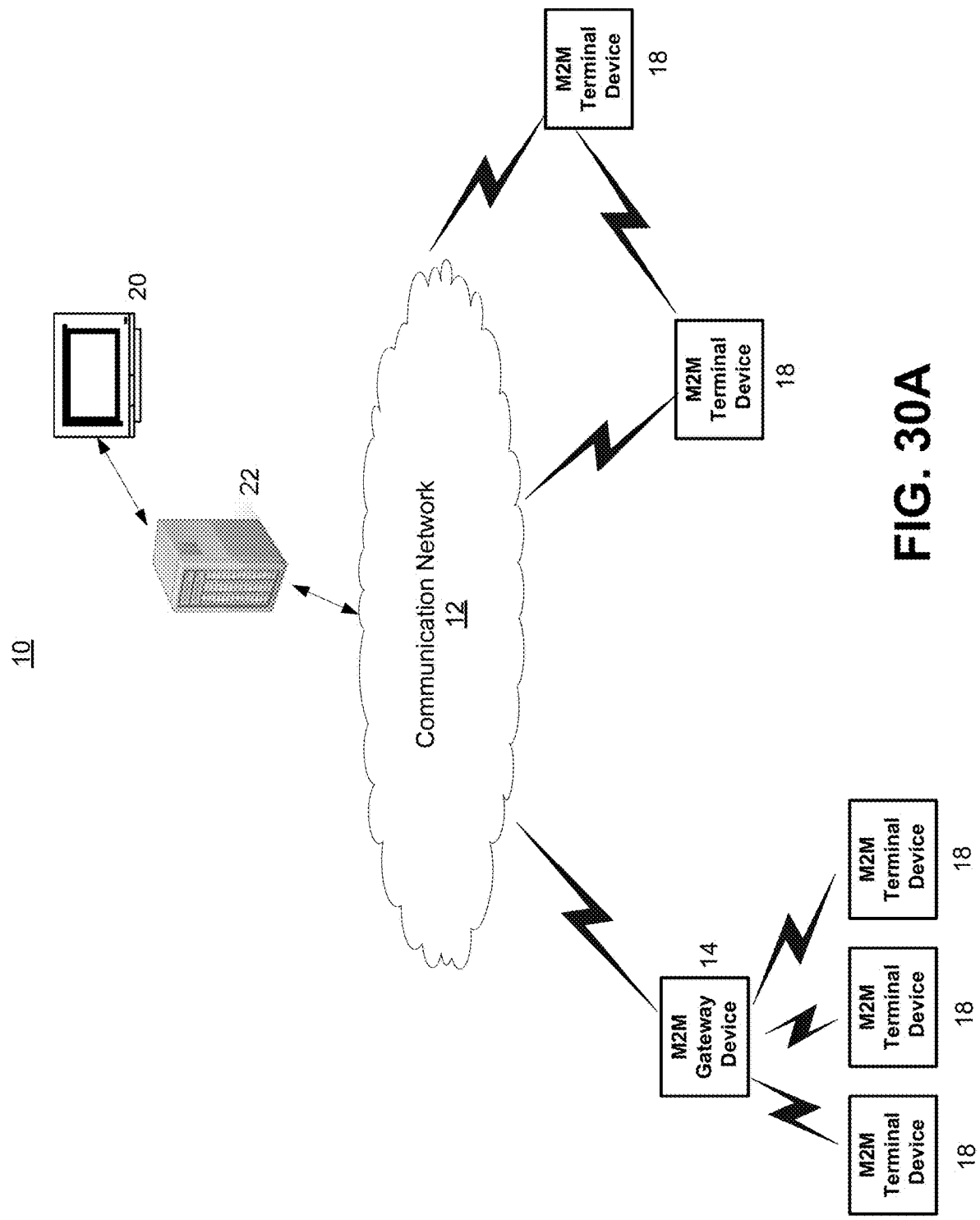
FIG. 30A is a system diagram of an example machine-to-machine (M2M) or Internet of Things (IoT) communication system in which IoT E2E service layer QoS Management matter may be implemented.
Figure 30B:
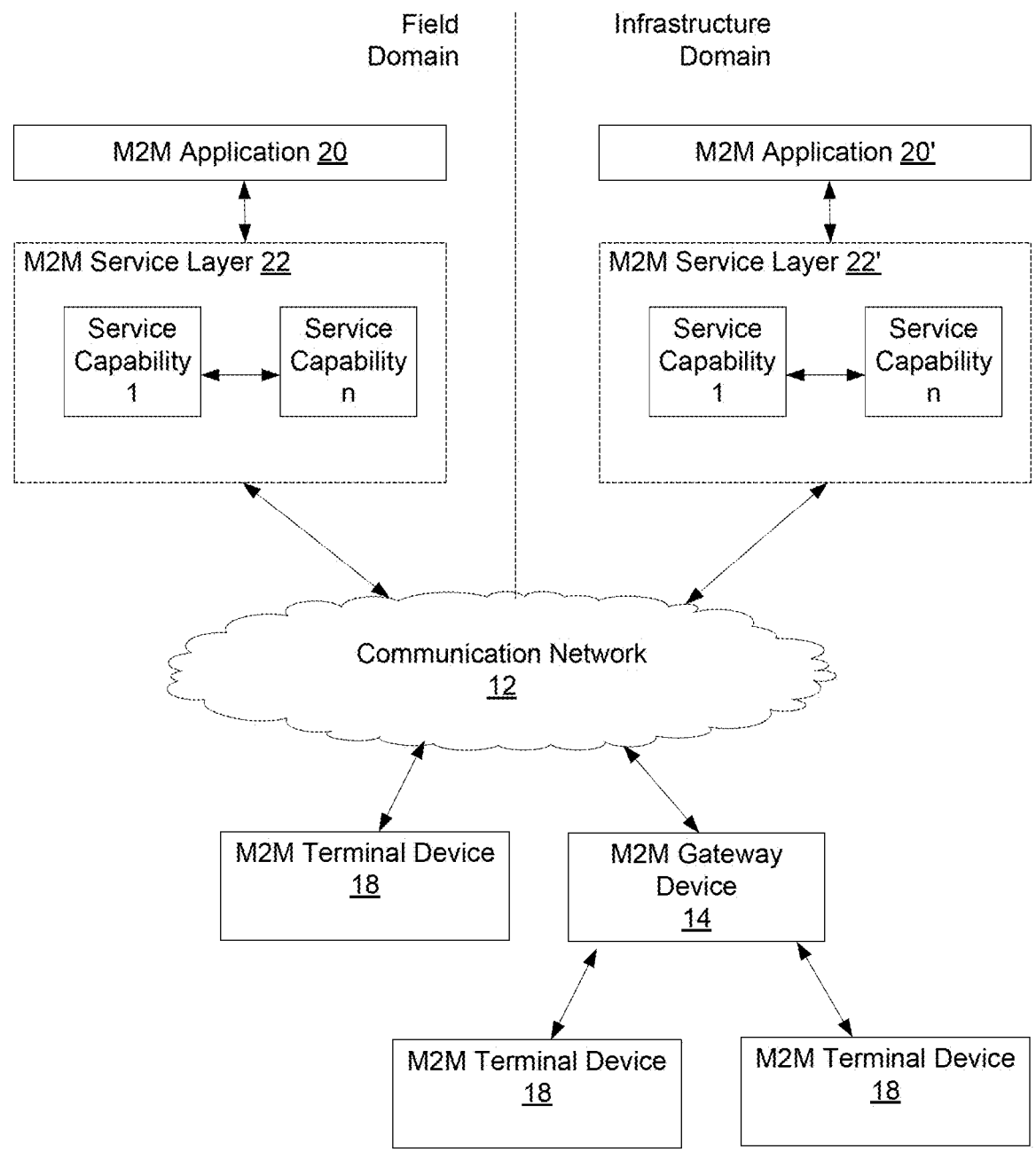
FIG. 30B is a system diagram of an example architecture that may be used within the M2M/IoT communications system illustrated in FIG. 30A.
Figure 30C:
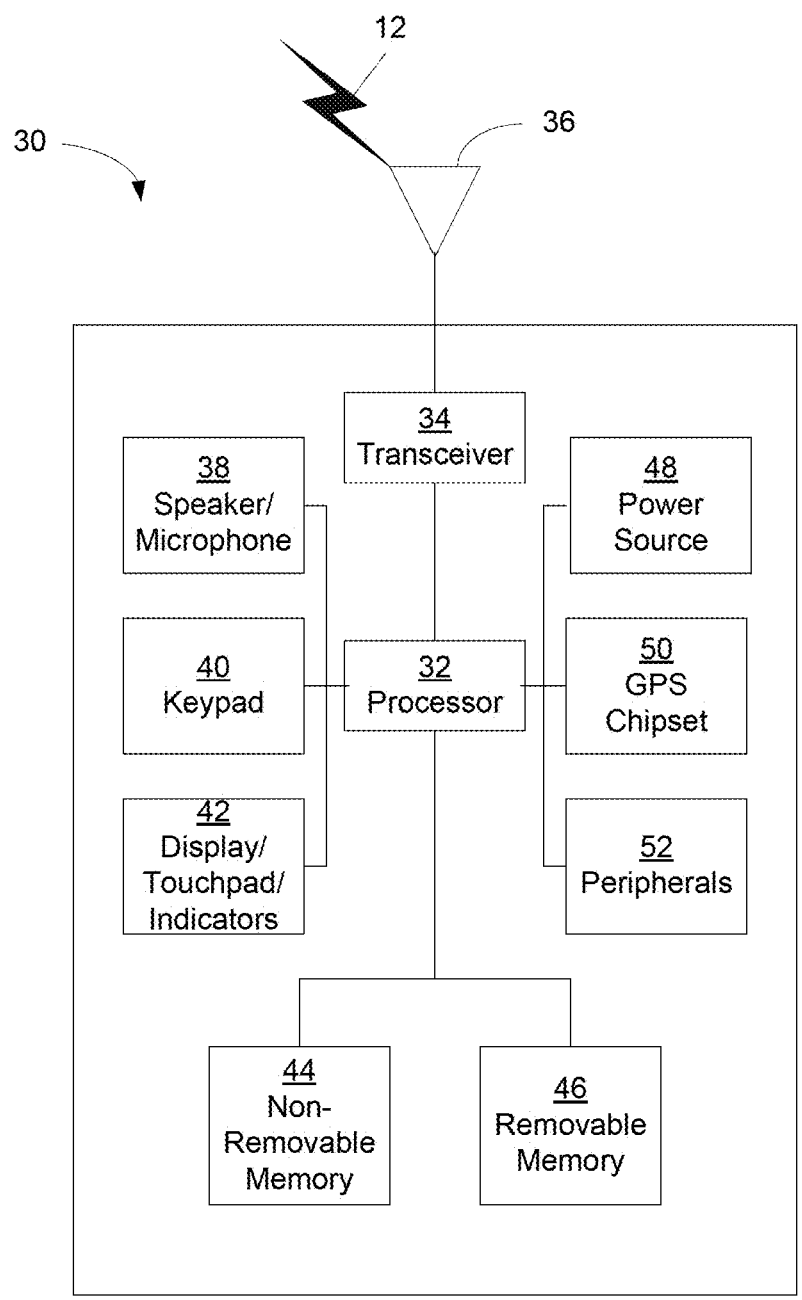
FIG. 30C is a system diagram of an example M2M/IoT terminal or gateway device that may be used within the communications system illustrated in FIG. 30A.
Figure 30D:
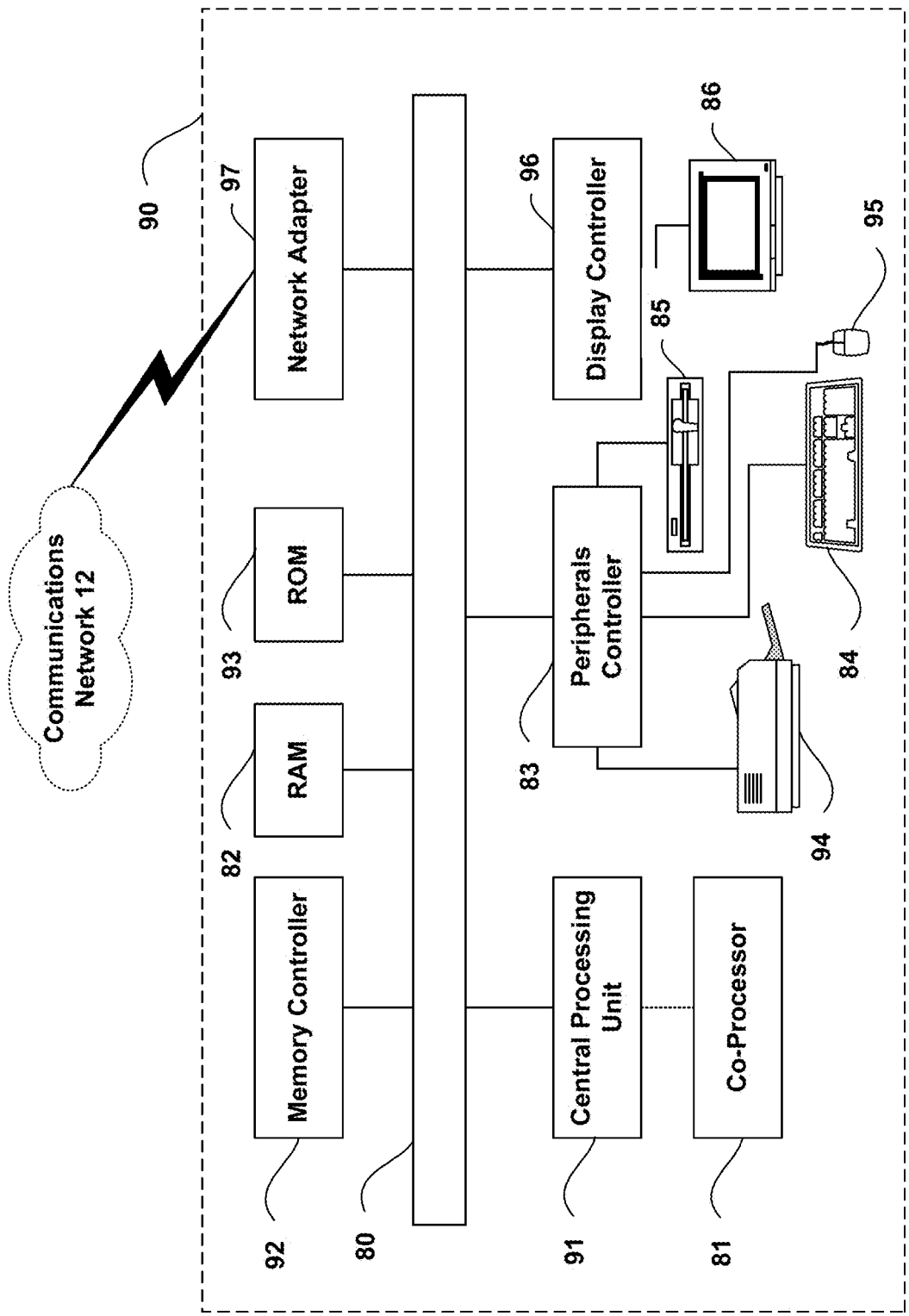
FIG. 30D is a block diagram of an example computing system in which aspects of the communication system of FIG. 30A may be embodied.

It is understood that the entities performing the steps illustrated in FIG. 12-FIG. 17, among others, are logical entities that may be implemented in the form of software (e.g., computer-executable instructions) stored in a memory of, and executing on a processor of, a device, server, or computer system such as those illustrated in FIG. 30C or FIG. 30D. That is, the method(s) illustrated in FIG. 12-FIG. 17, among others may be implemented in the form of software (e.g., computer-executable instructions) stored in a memory of a computing device, such as the device or computer system illustrated in FIG. 30C or FIG. 30D, which computer executable instructions, when executed by a processor of the computing device, perform the steps illustrated in FIG. 12-FIG. 17, among others herein. In an example, with further detail below with regard to the interaction of M2M devices, IoT device application 155 of FIG. 11 may reside on M2M terminal device 18 of FIG. 30A, while SLCM 157 and SLCM 158 of FIG. 11 may reside on M2M gateway device 14 of FIG. 30A.

Figure 12:
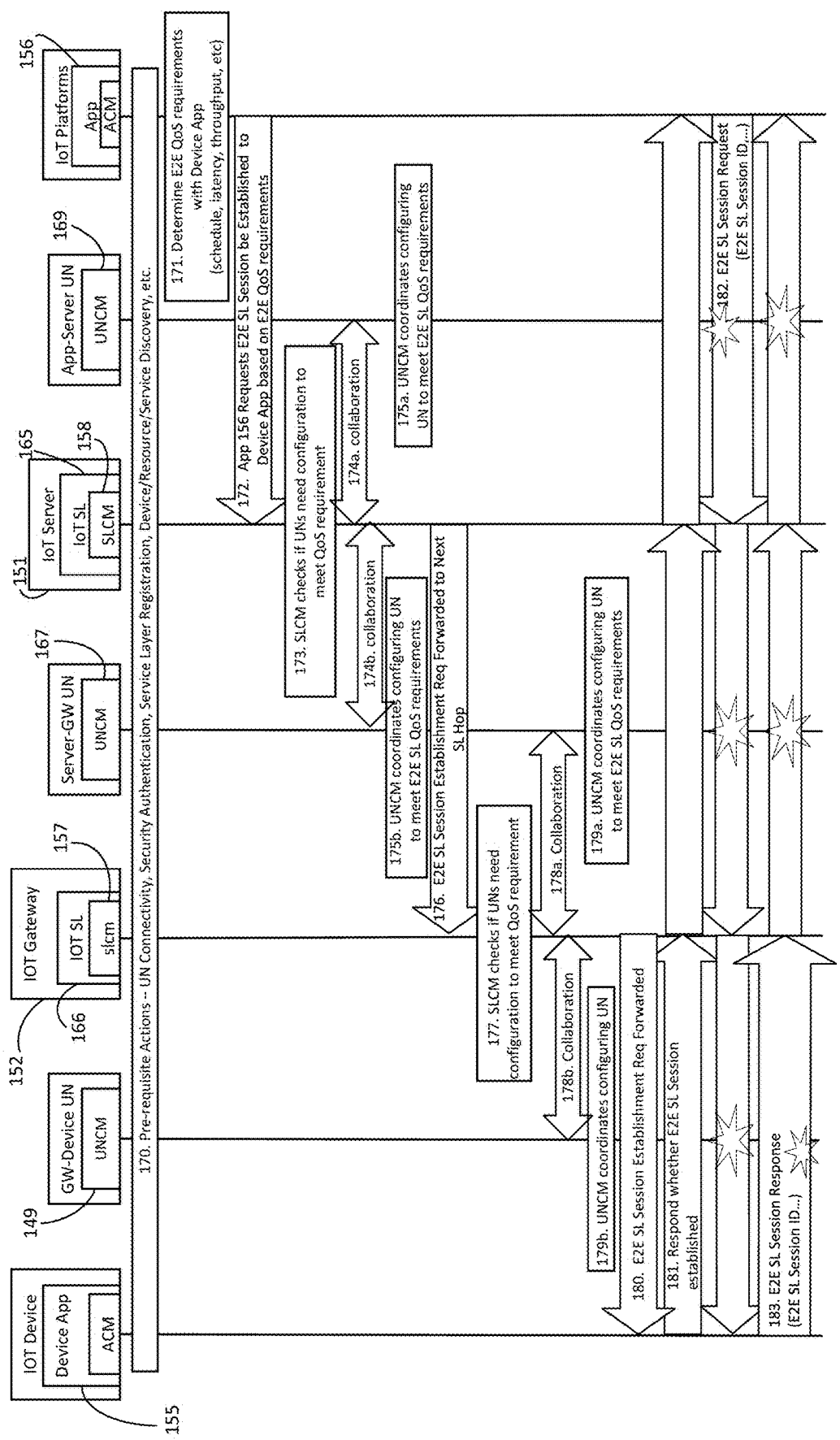
FIG. 12 illustrates an exemplary IoT E2E QoS Management Procedure.

FIG. 12 illustrates an exemplary message flow for SLCM function and UNCM function that may be used to manage the UN QoS between IoT devices, gateways, and servers in a coordinated E2E fashion. At step 170, there are prerequisite actions. For example, UN connectivity is established between each device, gateway, and server. Proper SL security procedures are performed such as establishing credentials and authentication between entities for each individual hop (not E2E). SL registration is performed between SL instances as well as between applications and their local SLs. Discovery of devices, resources, and services is performed by applications. At step 171, application 156 determines that it wants to communicate with one or more device applications. Based on use case requirements, application 156 determines the E2E QoS requirements between itself and the targeted device application (e.g., IoT device application 155). For example, the E2E communication schedule (e.g., time of day), E2E communication latency (e.g., round trip latency must not exceed a defined threshold), E2E jitter (e.g., variation in delay between sensor readings is not to exceed defined threshold), E2E error rate (e.g., E2E rate of errors in sensor reading messages is not to exceed a defined threshold), or E2E throughput (e.g., sensor readings per second), among other things.

With continued reference to FIG. 12, at step 172, application 156 sends a request to IoT SL 165 (which may be hosted on IoT server 151) to establish an E2E SL session between itself and IoT device application 155. The request of step 172 includes the E2E QoS requirements that application 156 defined in step 171. At step 173, SLCM 158 checks if UNs need configuration to meet QoS requirement specified for E2E SL Session. SLCM 158 assigns E2E SL Session ID and also determines next SL hop. SLCM 158, which is affiliated with IoT SL 165 hosted on IoT server 151 determines whether or not its current configuration and the configuration of its UNs (e.g., 3GPP 161, Wi-Fi 163, or broadband Ethernet 162) can meet the E2E SL session defined QoS requirements defined for reachability schedule, latency, jitter, error rate, throughput, level of security, or cost, among other things. SLCM 158 also derives a unique SL session ID. At step 174*a* and step 174*b*, SLCM 158 collaborates with UNCM 168 or UNCM 167 in each of the UNs that may connect SLCM 158 to its next hop E2E SL session partners to determine whether or not 3GPP 161 or broadband Ethernet 162 (or other UN) may be reconfigured (or is already configured) to meet the QoS requirements of the E2E SL session requested at step 172.

With continued reference to FIG. 12, at step 175*a* and step 175*b*, UNCM 168 of 3GPP 161 and UNCM 167 of broadband Ethernet 162 coordinates with other UN functions responsible for controlling schedule, latency, jitter, error rate, throughput, level of security, or cost management, among other things. In doing so, each UNCM determines whether or not the UN is able to process messages affiliated with the E2E SL session with the specified QoS settings defined by the E2E SL session. At step 176, SL instance (IoT SL 165) hosted on IoT server 151 selects a UN (e.g., broadband Ethernet 162) that can meet the session requirements and forwards the E2E SL session establishment request to the next SL hop, which is the SL instance (IoT SL 166) hosted on IoT gateway 152. A SL session ID is included in this request of step 176.

With continued reference to FIG. 12, at step 177, SLCM 157 checks if UNs need configuration to meet QoS requirement specified for E2E SL Session. SLCM 157 also determines next SL hop. SLCM 157 affiliated with IoT SL 166 hosted on IoT gateway 152 determines whether or not its current configuration and the configuration of its gateway-device UNs can meet the E2E SL session QoS requirements. In this example, requirements can be met. Similar to step 174*a* and step 174*b*, at step 178*a* or step 178*b*, SLCM 157 collaborates with UNCM 149 of 6LoWPAN 164 that may connect SLCM 157 to its next hop E2E SL session partners to determine whether or not 6LoWPAN 164 may be reconfigured (or also configured) to meet the QoS requirements of the E2E SL session requested at step 172. Similar to step 175*a* or step 174, at step 179*a* or step 179*b*, UNCM 168 of 3GPP 161 and UNCM 167 of broadband Ethernet 162 coordinates with other UN functions responsible for controlling schedule, latency, jitter, error rate, throughput, level of security, or cost management, among other things. In doing so, each UNCM determines whether or not the UN is able to process messages affiliated with the E2E SL session with the specified QoS settings defined by the E2E SL session. At step 180, IoT SL 166 hosted on IoT gateway 152 selects 6LoWPAN 164, which can meet the session requirements and forwards the E2E SL session establishment request to the next SL hop(s) towards the targeted E2E SL Session endpoint (e.g., IoT device application 155). The request of step 180 may include E2E SL Session ID. Alternatively the SL instance hosted on the IoT gateway 152 may proxy on behalf of the IoT device application and handle servicing this request on behalf of the IoT device application 155.

With continued reference to FIG. 12, at step 181, IoT device application 155 receives and processes the E2E SL Session Establishment Request. If IoT device application 155 agrees to join into an E2E SL Session with the originator of the request (e.g., IoT application 156) then IoT device application 155 responds by accepting the request. Otherwise it returns an error declining the request. The response includes the SL session ID specified in the corresponding request. IoT application 155 receives the response indicating that IoT device application 155 accepted the E2E SL Session Establishment request. At step 182, IoT application 156 then generates an E2E SL Session request to communicate with IoT device application 155. When creating the request of step 182, IoT application 156 may include the E2E session ID. This E2E session ID may be used by the UNs and SL instances in the E2E communication path to properly process the request such that the E2E QoS settings configured during E2E SL Session Establishment are met. For example, UN detects (e.g., using a deep packet inspection technique) E2E SL session ID marker in message and using this SL session ID processes the message based on E2E SL Session QoS requirements that it maintains. At step 183, IoT device application 155 receives the request of step 182 and then generates an E2E SL Session response back to IoT application 156. When creating the response of step 183, IoT device application may include the E2E session ID. This E2E session ID is used by the UNs and SL instances in the E2E communication path to properly process the response such that the E2E QoS settings configured for the session during E2E SL Session establishment are met.

Table 2 discloses several example types of SL centric informational elements that may be provided (e.g., included in a SL session establishment request) to assist in the processing of E2E SL sessions. Each E2E SL session may have both SL QoS information as well as UN QoS related information associated with it. This information can be used to manage the end-to-end SL QoS between the SL session endpoints as well as the UN QoS between each hop of the SL session. This information can be collected, maintained, or shared by SLs (e.g., using SLCM functions), UNs (e.g., using UNCM functions), as well as SL session endpoints.

The informational elements of Table 2 may enable a SL session originator (e.g., IoT device application 156) to define the E2E QoS requirements between itself and one or more other targeted SL session endpoints. Likewise, a SL can use this information to determine a SL session originator's E2E QoS requirements and in turn try to satisfy them using methods disclosed herein.

TABLE 2

SL Session E2E QoS Information

| SL Session E2E QoS Related Informational Element | Description |
| --- | --- |
| E2E SL Session ID | Unique ID of the SL session that is assigned during session establishment by the SL |
| Originating E2E SL Session Endpoint | The address/id (e.g., resource URI, App ID, SL ID, etc.) of the originating SL session endpoint |
| Targeted E2E SL Session Endpoint | The address/id (e.g., resource URI, App ID, SL ID, etc.) that the SL session originator is targeting to establish a SL session with |
| Required E2E SL Session Latency | Required E2E SL session communication latency as specified by the SL session originating endpoint. This latency is measured in terms of time from when the originating endpoint sends a SL request, to when it receives a corresponding response back.<br>This latency may be given in terms of a number (e.g., 100 msecs) or it may also be given in other terms (e.g., LOW, MED, or HIGH) that may be converted to a value for use in the network.<br>Note that this latency may also be split up into separate request and response latencies if required. |
| Required E2E SL Session Throughput | Required E2E SL session communication throughput as specified by the SL session originating endpoint. This E2E throughput can be expressed and measured in various terms. In one example, throughput can be in terms of the rate at which the originating SL session endpoint receives responses (e.g., sensor measurements) back for corresponding requests it has originated to a targeted SL session endpoint. For example, originating endpoint receives 1 sensor measurement per second from targeted endpoint. In another example, E2E throughput may be expressed in terms of the rate at which a targeted SL session endpoint receives requests from an originating SL session endpoint. E.g., Targeted endpoint receives 1 command per second from originating endpoint. In addition to a specified rate, E2E throughput may also have an associated max SL message size specified.<br>This throughput may be given in terms of a specific rate (e.g., 10 sensor readings/minute) or it may also be given in other terms (e.g., SLOW, NORMAL, or FAST) which may then be converted to a value for use in the network. |
| Required E2E SL Session Reachability Schedule | Required E2E SL session reachability schedule as specified by the SL session originating endpoint. This is the window(s) of times that the targeted SL session endpoint as well as any intermediate SL instances must be reachable such that the originating endpoint may reach the targeted SL session endpoint to communicate with it during these times.<br>The format of this schedule may be given in terms of a time like the format defined by oneM2M and described herein, or it may also be given in other terms (e.g., "once a day") which may then be converted into a value for use in the network. |
| Required E2E SL Session Error Rate | Required E2E SL session communication error rate as specified by the SL session originating endpoint. This E2E error rate is the summation of the error rates of the individual SL hops which make up the E2E communication path.<br>This jitter may be given in terms of a specific rate (e.g., 1 error/sec) or it may also be given in other terms (e.g., LOW, MED, or HIGH) which may then be converted to a value by the SL for use in the network. |
| Required E2E SL Session Jitter | Required E2E SL session jitter as specified by the SL session originating endpoint. This jitter is measured in terms of the variation in delay between two consecutive SL requests or responses received by a SL session endpoint.<br>This jitter may be given in terms of a number (e.g., 100 msecs) or it may also be given in other terms (e.g., LOW, MED, or HIGH) which may then be converted to a value by the SL for use in the network.<br>Note, this jitter may also be split up into separate Request and Response jitter if required. |

TABLE 2-continued

SL Session E2E QoS Information

| SL Session E2E QoS Related Informational Element | Description |
|---|---|
| Required E2E SL Session Cost Level | Required E2E SL session communication cost level as specified by the SL session originating endpoint. This E2E cost level is the cost to communicate via the SL session.<br>This jitter may be given in terms of a specific cost (e.g., $0.01/request) or it may also be given in other terms (e.g., LOW, MED, or HIGH) which may be converted to a value by the SL for use in the network. |
| Required E2E SL Session Security Level | Required E2E SL session communication security level as specified by the SL session originating endpoint. This E2E security level defines how secure the communication must be when using the SL session.<br>This security level may be given in terms of a specific type of security (e.g., 128 TLS-PSK) or it may also be given in other terms (e.g., LOW, MED, or HIGH) which may be converted to a security level by the SL for use in the network. |

Table 3 proposes several types of UN centric informational elements that may be used in the support of E2E SL QoS. For example, for each communication hop in an E2E SL session, the entity initiating or forwarding the SL establishment request may make this information available (e.g., by including it in the request itself). This information may also be collected, tracked, and maintained either by the SL itself or the UNs. Also, in certain cases the SL and UNs may collaborate with one another and exchange this information (e.g., via the SLCM or UNCM). This disclosure proposes methods to support this.

TABLE 3

UN QoS Information Used To Manage SL QoS

| UN QoS Related Informational Element | Description |
|---|---|
| Type | Type of this particular UN<br>E.g., 3GPP, Wi-Fi, Bluetooth, Ethernet, etc. |
| Priority | Usage ranking of this UN with respect to the other UNs available for this SL session hop<br>E.g., $1^{st}$, $2^{nd}$, $3^{rd}$, etc. |
| UN-ID | UN ID used to uniquely identify this UN versus other UNs<br>E.g., ID assigned by network operator |
| Address | Address of one or more communication endpoints or hop-by-hop intermediaries connected to this UN.<br>E.g., IP Address, Port, MAC Address, etc. |
| Schedule | Different connectivity schedules supported by the UN and that are available for this SL hop.<br>Schedule may be expressed in a format such as Seconds, Minutes, Hours, Days, Weeks, Months, or Years. |
| TxLatency/ RxLatency | Different supported latency levels for transmitting/receiving a message between for this SL hop over this UN.<br>This attribute may be updated with latency information published or retrieved from an UN (e.g., via an UNCM).<br>Latency may be expressed in a format such as 10 msec. |
| TxMsgSize/ RxMsgSize | Max size of a transmitted/received message allowed over this UN and that are available for this SL hop.<br>May be expressed in a format such as E.g., 256 bytes |
| TxMsgRate/ RxMsgRate | Max rate of transmitted/received messages allowed over this UN and that are available for this SL hop.<br>May be expressed in a format such as 500 requests/sec |
| costLevel | Different cost tiers supported by this UN that are available for this SL hop.<br>Cost tiers may have associated latency, throughput, schedule, error rates, security levels, etc. |
| securityLevel | Different levels/types of security supported by this UN that are available for this SL hop. |
| TxErrorRate/ RxErrorRate | Different raw transmit/receive error rates supported by this UN and that are available for this SL hop.<br>May be expressed in a format such as 2 errors/sec, 5 retries/100 requests, etc.<br>May be expressed in a format such as BER, PER, 2 errors/sec, 5 retries/100 requests, etc. |

Figure 13:
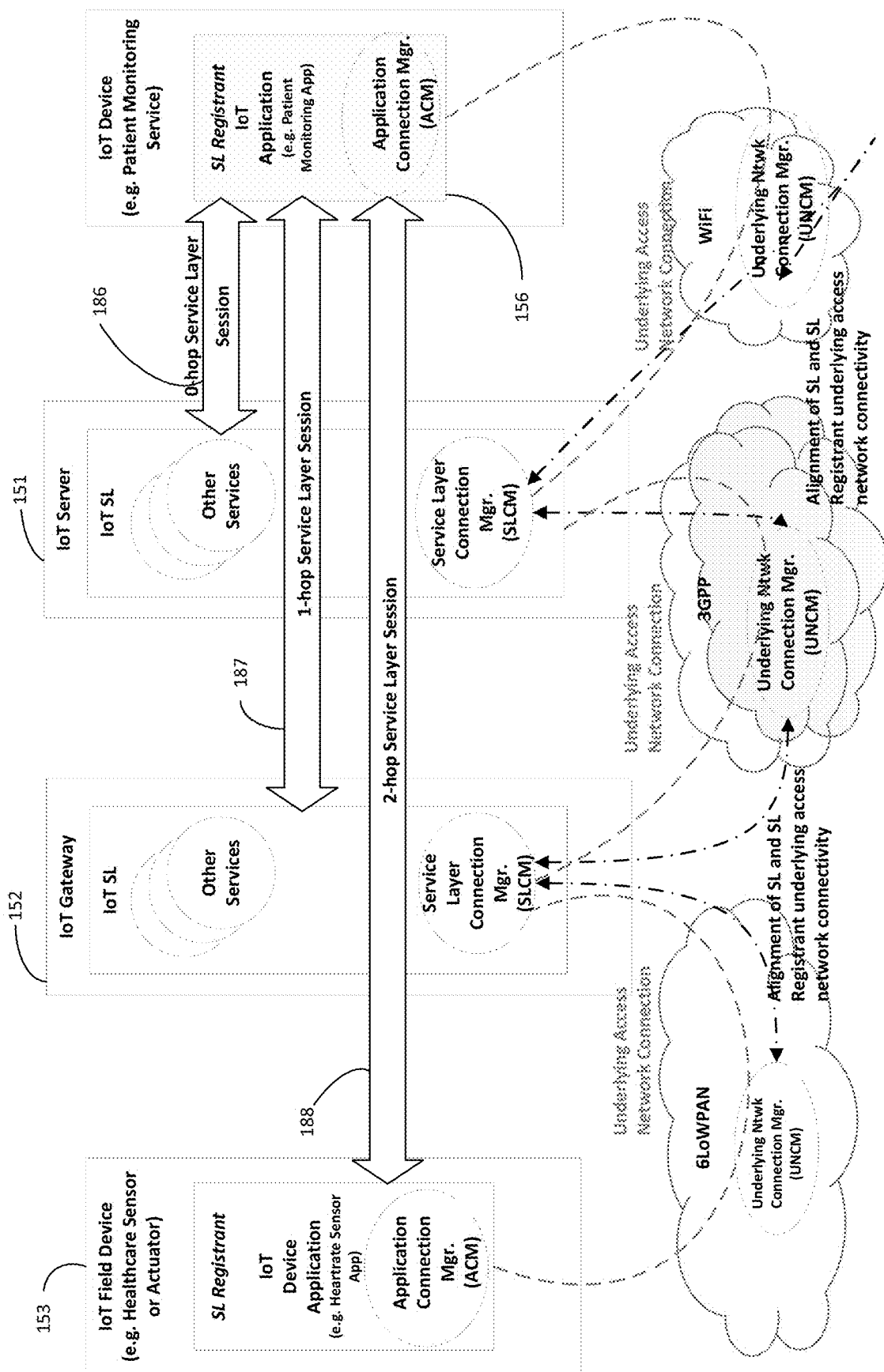
FIG. 13 illustrates an exemplary E2E SL Session QoS.

FIG. 13 illustrates use case examples of 0-hop 186, 1-hop 187, and 2-hop 188 E2E SL sessions being established between applications hosted on an IoT field device 153 (e.g., IoT sensor), IoT gateway 152, IoT server 151, and IoT application 156. In each of these cases, IoT application 156 initiates the establishment of an E2E SL session. In 0-hop 186, IoT application 156 establishes an E2E SL session with IoT Server 151. In 1-hop 187, IoT application 156 establishes an E2E SL session with the IoT gateway 152. In 2-hop 188, IoT application 156 establishes an E2E SL session with the application hosted on IoT field device 153.

In the three E2E SL sessions being established of the use cases shown, each SLCM function supported by SLs hosted on IoT server 151 and IoT gateway 152 may communicate with each UNCM function supported by the UNs. In doing so, SLCMs and UNCMs coordinate the appropriate selection and configuration of the UN QoS used for each hop of the E2E SL session such that the E2E QoS requirements of the E2E SL session may be met.

Methods to manage UN QoS to satisfy E2E SL QoS requirements are disclosed herein. Specifically, these methods involve managing UN QoS during E2E SL session establishment, E2E SL session communication, and E2E SL session tear-down.

Figure 14:
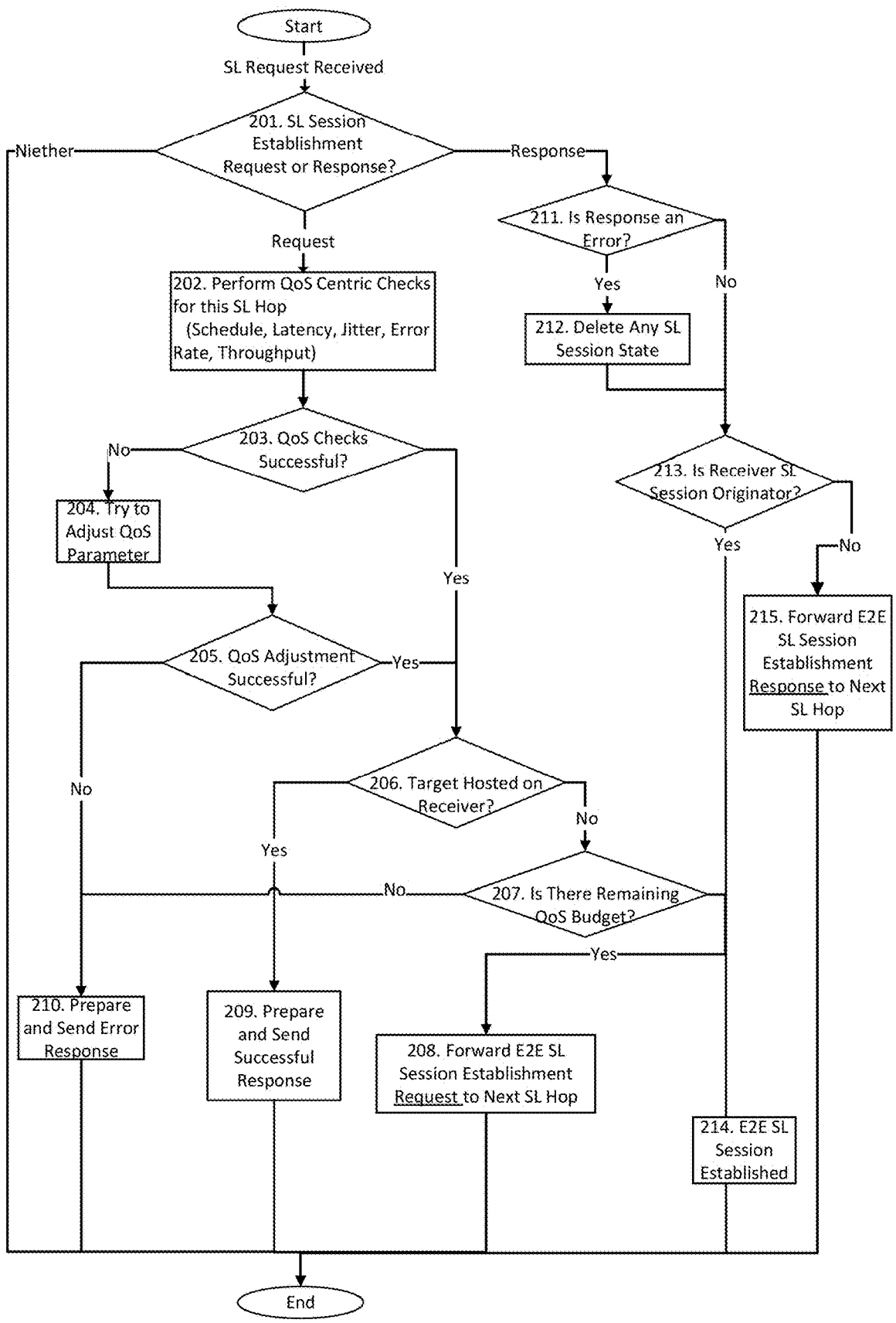
FIG. 14 illustrates an exemplary Method to Manage UN QoS during E2E SL Session Establishment.

FIG. 14 illustrates an exemplary method for managing UN QoS during E2E SL session establishment is disclosed. A pre-requisite to the procedure shown in FIG. 14 is a SL registrant (e.g., IoT application 156) generates a request for the establishment of a SL session between itself and a targeted SL session endpoint (e.g., IoT device application 155). In this request, IoT application 156 may specify its QoS requirements for the E2E SL session by including information in the request such as the SL centric information specified in Table 2 and perhaps access network centric information specified in Table 3, if applicable. The point at which the E2E SL Session Establishment Request is received by the SL registrant's local SL, is the point at which the procedure defined in FIG. 14 starts. This procedure is used to process the E2E SL Session Establishment Request as it is propagated towards the targeted SL session endpoint as well as the corresponding response as it flows back towards the SL registrant that originated the request. The detailed steps of the proposed procedure are defined below. At step 201, a receiver (e.g., an intermediate SL instance or the targeted SL session endpoint, such as IoT Server 165, IoT gateway 152, or lot device application 155) detects an incoming request and checks whether or not it is a SL Session Establishment Request or Response. This check may be performed by analyzing header information in the SL message. The header information may indicate the SL message type of the SL message. If the received SL message of step 201 is a SL Session Establishment Request, then to step 202. If the SL message received in step 201 is a SL Session Establishment Response it proceeds to step 211.

With continued reference to FIG. 14, at steps 202 and step 203 if the SL message of step 201 is a SL Session Establishment Request, the Receiver's SLCM may perform QoS checks and possible alignment between itself and its neighboring SL session hop partner, as discussed below, such as SL Reachability Schedule Check, UN Connectivity Check, SL Hop Latency Check, SL Hop Throughput Check, SL Hop Jitter Check, SL Hop Error Rate Check, SL Hop Cost Level Check, or SL Hop Security Level Check, among other things. Note that before doing the checks SLCM may perform a check to verify whether an E2E SL session already exists. SL Reachability Schedule Check—To check and align SL reachability schedules, the Receiver's SLCM or ACM compares its current SL reachability schedule with the E2E SL session reachability schedule specified in the request. This check verifies whether the Receiver's SL is active and reachable to process SL messages during the times required for the new SL session being established. To do this, the Receiver's SLCM or ACM checks whether it's current reachability schedule window(s) are aligned (or not) with those specified in the request. This may be done by comparing the start and end times of each reachability window specified in the request to the start and end times of the Receiver's current reachability windows. UN Connectivity Check—To check and align UN connectivity schedules, the Receiver's SLCM or ACM may compare the different types of UNs it supports for each of its reachability windows against those required by the new SL session. These may either be specified in the request or the requester may make this information available to the Receiver in advance. In making this information available to the Receiver in advance so, the Receiver's SLCM or ACM may check, whether or not at least one common UN is active and providing the necessary connectivity between the Receiver and its neighboring SL session hop partner(s) for each reachability window that is required for the SL session.

With continued reference to steps 202-203 of FIG. 14, SL Hop Latency Check—The Receiver's SLCM or ACM may either obtain latency information for this particular SL hop from the UNCM if available. If unavailable from the UNCM, the SLCM or ACM may perform latency checks by comparing the communication latency between itself and its neighboring SL session hop partner to determine whether it is less than the Required E2E SL Session Latency specified in the incoming request. To perform this check the Receiver's SLCM or ACM may auto-generate one or more separate SL ping requests (or the like), which it may target towards its neighboring SL session hop partner(s) and receive corresponding responses back. To measure the latency, SLCM or ACM may measure the time each SL ping is sent and the time a response is received. The SLCM or ACM may then subtract and average to compute the latency. If more than one UNs connect the Receiver and it neighboring SL session hop partner(s), the SLCM or ACM may perform this latency check on each UN and compare them to select the best UN which meets the SL session latency requirements. The SLCM or ACM may also maintain these latency measurements and re-use them for future SL session requests such that it does not need to repeat the latency measurements as often. The SLCM or ACM may also periodically re-perform this latency check to monitor whether the latency is continues to meet the SL session latency requirement or not. If not, the SLCM or ACM may signal an error or an event to the originating SL session endpoint to indicate this. SL Hop Throughput Check—The Receiver's SLCM or ACM may obtain throughput information from the UNCM if available. If unavailable, the SLCM or ACM may perform throughput checks by comparing the communication throughput between itself and its neighboring SL session hop partner to determine whether it meets or exceeds the required E2E SL session throughput specified in the incoming SL session establishment request. To perform this check the Receiver's SLCM may auto-generate a repeated sequence of SL ping requests which it may target towards its neighboring SL session hop partner and receive corresponding responses back. The SLCM may configure the length of each ping to match the max SL message size specified in the SL session establishment request. To measure the throughput, the SLCM may measure the rate at which it receives responses. If more than one UNs connect with the Receiver and it neighboring SL session hop partner, the SLCM may perform this throughput check on each UN and compare them. The SLCM may also maintain these throughput measurements and re-use them for future SL session requests such that it does not need to repeat the measurements as often. The SLCM or ACM may also periodically re-perform this throughput check to monitor whether the throughput continues to meet the SL session requirements. If not, the SLCM or ACM may signal an error or an event to the originating SL session endpoint to indicate this.

With continued reference to steps 202-203 of FIG. 14, SL Hop Jitter Check—The Receiver's SLCM or ACM may obtain jitter information from the UNCM if available. If unavailable, the SLCM or ACM may perform a jitter check using a similar procedure as described above in the throughput check. Instead of measuring throughput, the SLCM or ACM may measure the variation in delay between consecutive ping responses. SL Hop Error Rate Check—The Receiver's SLCM or ACM may obtain error rate information from the UNCM if available. If unavailable, the SLCM or ACM may perform an error rate check using a similar procedure as described herein with regard to throughput check. Instead of measuring throughput, the SLCM or ACM may measure the error rate for a sequence of ping requests and responses. SL Hop Cost Level Check—The Receiver's SLCM or ACM may obtain cost information from the UNCM if available and compare it against the cost requirements (e.g., budget) specified in the request to determine if the cost of using the UN is aligned with the E2E SL session requirements. SL Hop Security Level Check—The Receiver's SLCM or ACM may obtain security information from the UNCM, if available, and compare it against the security requirements specified in the request to determine if any of the supported levels of security in the UN are aligned with the E2E SL session requirements.

With continued reference to FIG. 14, at step 204, the Receiver's SLCM or ACM attempts to adjust QoS parameters (if any) that failed checks in step 203. The SLCM or ACM tries to adjust QoS parameters in UNs between the Receiver and its neighboring SL session hop partner(s) by collaborating with UNCMs in each respective UN (if supported). To do this, the SLCM or ACM may create a request which it sends to one or more UNCMs. In this request, the SLCM or ACM may include the types of information such as E2E SL session ID, UN Addresses of the Receiver and its neighboring SL session hop partner, and required UN QoS parameter between Receiver and its neighboring SL session hop partner (see definitions for each Table 2 and Table 3).

With continued reference to step 204 of FIG. 14, using this information, an UNCM may determine the QoS requirements (e.g., schedule, latency, jitter, error rate, throughput, cost, security) between the Receiver and its neighboring SL session hop partner(s). An UNCM may then coordinate with other functions in the UN to determine if it is possible to configure the UN to meet SL session QoS requirements. This may either be done for all SL communication taking place between the Receiver and its neighboring SL session hop partner over this UN, or alternatively it may be done selectively by the UN just for messages associated with this particular SL session and marked with this particular E2E SL Session ID. Discussed below are some QoS parameter specific adjustment procedures, such as SL Reachability Schedule Adjustment or UN Connectivity Schedule Adjustment. SL Reachability Schedule Adjustment—If SL reachability schedules are not aligned with one another, the Receiver's SLCM or ACM may try to adjust the Receiver's SL reachability window(s) to try to align them. To do this, the Receiver's SLCM or ACM must be careful not to impact any other existing SL sessions. This may be achieved by the SLCM or ACM aggregating the Receiver's existing SL reachability windows required for its current SL sessions with the reachability window required by the new SL session being established. In doing so, the SLCM or ACM may ensure that all SL sessions may coexist with another (e.g., by aligning or not aligning the session schedules with one another). UN Connectivity Schedule Adjustment—For cases where adequate UN connectivity does not exist, the SLCM or ACM may communicate with UNCMs in each respective UN to try and modify UN connectivity schedules to align them with the E2E SL session requirements. To do this, the SLCM or ACM may create a request which it sends to an UNCM. In this request, the SLCM or ACM may include information such as a SL Session ID and a connectivity schedule for the Receiver and/or its neighboring SL session hop partner. An UNCM may then use this information to coordinate with other UN functions to attempt to modify connectivity schedules such that they align with one another during the times required for SL session communication. If the connectivity schedule check and alignment actions described above succeed, the procedure proceeds to perform latency checks, otherwise it proceeds to step 210 where the Receiver prepares and sends an error response indicating that proper connectivity may not be established between the Receiver and its neighboring SL session hop partner(s). To provide additional information which may be helpful, the achievable schedule may be returned in this error response.

With continued reference to FIG. 14, at step 205, if the required QoS parameter adjustment succeeds, the procedure proceeds to step 206 to check whether the targeted SL session endpoint is hosted remotely or not, otherwise it proceeds to step 210 where the Receiver prepares and sends an error response indicating that required QoS may not be met. To provide additional information which may be helpful, the achievable QoS parameter values may be returned in this error response. At step 206, the Receiver's SLCM or ACM checks whether the targeted SL session endpoint specified in the request to establish a SL session is hosted locally or whether must be forwarded another hop. This may be done by comparing the Receivers address with the targeted SL session endpoint's address. If the request must be forwarded another SL hop, the procedure proceeds to step 207 to prepare the request to be forwarded. Otherwise the procedure proceeds to step 209 to prepare the SL session establishment response. A request may be forwarded from one service layer node to another service layer node until the end-to-end service layer session is established. At step 207, the SL session establishment request is forwarded to the next hop since the targeted SL session endpoint is not hosted by the Receiver. Before forwarding the request, the Receiver's SLCM or ACM may update the request to indicate how much of the E2E QoS budget remains for certain QoS parameter such as latency, jitter, and error rate for the subsequent hops to consume. To do this, the Receiver's SLCM or ACM may subtract the measured QoS parameter consumed by its hop from the E2E SL session value carried in the request. In doing so, when the next hop receives the request the remaining budget for each QoS parameter will have been adjusted to account for the prior hops in the E2E communication path.

With continued reference to FIG. 14, at step 208, E2E SL session establishment request is forwarded to next hop. At step 209, the targeted SL session endpoint is hosted by the Receiver. Upon receiving this request, the Receiver may perform actions such as, verifying that the target exists and verifying that the originating SL session endpoint has the proper permissions to establish an E2E SL session with the target. The Receiver may formulate a successful SL session establishment response. The response may contain information such as E2E SL Session ID, a successful response code, or measured E2E QoS parameters as measured during the hop-by-hop E2E SL layer session establishment. The measured E2E QoS parameters may include measurements such as the remaining latency, jitter, cost, and error rate budgets as well as the minimal throughput measured during the hop-by-hop E2E SL layer session. This response is then sent back to the Receiver's same neighboring SL session hop partner that it received the request from. Upon receiving this response, the neighboring SL session hop partner may process the response using this same procedure (see step 211). At step 210, the Receiver was not able to successfully process the E2E SL Session Establishment request. The Receiver may return an error response to its same neighboring SL session hop partner which it received the request from. Upon receiving this response, the neighboring SL session hop partner may process the response using this same procedure (see step 211).

With continued reference of FIG. 14, at step 211, the Receiver's SLCM checks the E2E SL Session Establishment response to determine whether it is a successful response or an error. If it is a successful response the procedure proceeds to step 213. Otherwise the procedure proceeds to step 212. At step 212, in the case of an error response, a SL session state is deleted. The Receiver SLCM removes the SL session state that it maintains and also communicates with each UNCM in the underlying networks it supports to have them tear down the SL session state and configuration. This may include removing UN connectivity, latency, jitter, error rate and throughput configuration that is based on SL Session that was configured during E2E SL Session Establishment processing. At step 213, the Receiver checks if it is the E2E SL session originating endpoint based on checking the SL Session ID to determine if it matches any outstanding E2E SL Session Establishment Requests the Receiver may have. If it matches, then the Receiver processes the response to determine whether E2E SL Session Establishment Request was successful or not. If not, then the procedure proceeds to step 215 to forward the response to the next hop. At step 214, the E2E SL Session is deemed successfully established by the E2E SL originating endpoint. At step 215, the Receiver's SLCM or ACM forwards E2E SL Session Response to its corresponding neighboring SL session hop partner for this session such that the response makes it way towards E2E SL session originating endpoint.

Figure 15:
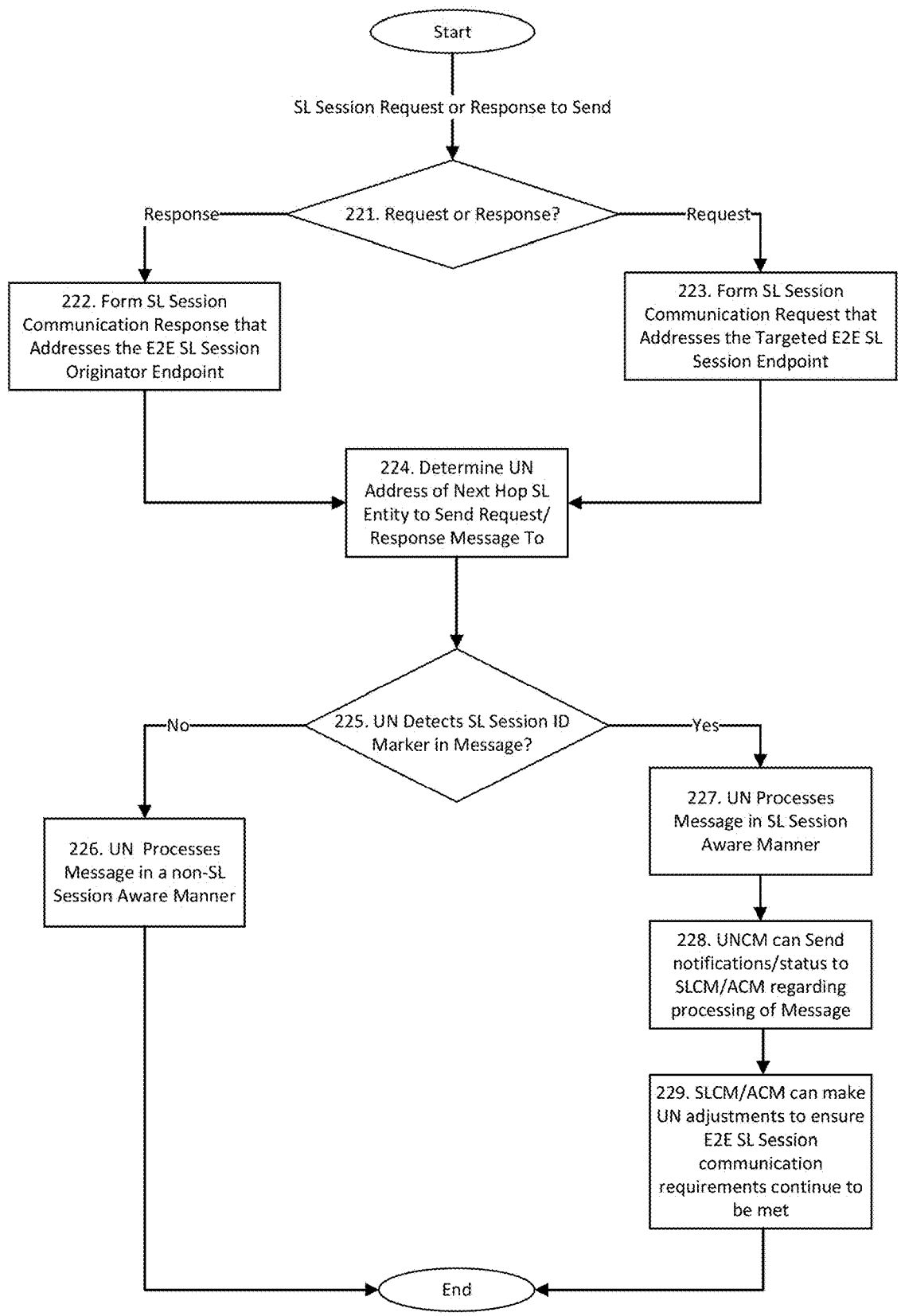
FIG. 15 illustrates an exemplary Method to Manage UN Connections While Sending E2E SL Session Messages.

FIG. 15 illustrates an exemplary method to manage UN connections while sending E2E SL session messages. Once established, an E2E SL Session may be used to send and receive E2E SL Session Communication Requests and Responses. At step 221, an E2E SL Session participant (e.g., an SL Session endpoint or intermediate SL instance) determines that it needs to send an E2E SL Session Communication Request or an E2E SL Session Communication Response message via a particular E2E SL Session that has been already established. At step 222, to send a response via an E2E SL Session, the participant creates the response and configures the E2E Session ID to match the E2E Session ID specified in the request. The response may include other information as well such as application specific response information. The targeted destination for the response is determined by the SLCM. To do this the SLCM or ACM uses a local state that it maintains for each and every E2E SL Session Request that it initiates or re-targets (as described in Step 223 below). Using the E2E SL Session ID, the SLCM or ACM looks up where it should send the response to. At step 223, to send a request via an E2E SL Session, the participant creates the request and configures the destination address to the E2E SL Session endpoint it is targeting. It also includes the E2E Session ID corresponding to the SL session it wants to use to communicate with this targeted endpoint. The request may include other information as well such as application specific request information. Upon sending the request, the SLCM or ACM maintains SL session state for the request. The SLCM or ACM maintains whether it originated the request or whether it re-targeted the request. For the case where it re-targeted the request, the SLCM also keeps track from which SL entity it received the request to be re-targeted. This information is kept tracked of using the E2E SL Session ID.

With continued reference to FIG. 15, at step 224, the E2E SL Session Communication Request/Response needs to be routed towards the targeted (in the case of a request) or originating (in the case of a response) E2E SL Session endpoint. So, one of the actions involved in this process for the SLCM or ACM may be to analyze the destination address specified in E2E SL Session Communication Request/Response to determine the next SL hop to route it to. This may involve the SLCM or ACM comparing the E2E SL Session ID contained in the request/response against SL routing state to determine the next SL hop. This may result in a routable address, such as a IP address of the next hop SL. This routable address may then be resolved into a UN address. At step 225, the message is then handed off from the SLCM or ACM to the corresponding UN that was assigned during E2E SL Session Establishment. When the UN receives this message it may use its UNCM function to analyze the message to determine whether or not it contains an E2E SL Session ID marker which the UN recognizes. For example, the UNCM may use Deep Packet Inspection (DPI) techniques to analyze the message and search for E2E SL Session IDs that the UNCM was configured with during E2E SL Session Establishment. At step 226, for the case where the UN does not support processing messages in a SL Session aware manner or for the case where the current message contains an E2E SL Session ID that is recognizable by the UN, then the UN may process the message in a non-SL session aware manner. In this case, the SL is responsible for ensuring E2E QoS is achieved. It may do so using UN QoS information that the UN makes available to the SL. The SL may in turn make adjustments (e.g., change UNs) to ensure E2E QoS is maintained.

At step 227, for the case where the UN does support processing messages in a SL Session aware manner and detects that the current message does contain an E2E SL Session ID that it recognizes, then the UNCM function may process the message in a SL session aware fashion. In doing this, the UNCM may inform other functions in the UN of the E2E SL Session ID associated with this message. Using this information, the other functions may process the message in such a way that the E2E SL Session QoS requirements may be met. For example, the UN may control the scheduling of the message by controlling when it triggers the destination to connect to the network so it may send it the message. Similarly, the UN may control the latency, jitter and throughput of the message by controlling the delays that the message incurs while traversing through the various UN functions. At step 228, The UNCM (if supported) of the UN may provide feedback (e.g., notifications) to the SLCM regarding the processing of the E2E SL Session Communication Request/Response message. This feedback may include whether or not the UN was able to meet the same QoS levels which it reported during the E2E SL Session Establishment and if not what the new measurements were for this given message.

This feedback may also include whether a specified error rate threshold has been exceeded. For example, if the UN becomes congested and is no longer able to meet the SL session requirements configured during SL session establishment, the UNCM may notify the SLCM or ACM. At step 229, sharing UN information with the SLCM or ACM on a message by message basis, periodic basis, or on an event basis (e.g., when processing a message it results in latency or throughput that does not meet the requirements of the SL session) may allow the SLCM or ACM to track whether or not this particular UN is continuing to maintain and meet the QoS requirements of the E2E SL Session. For the case, where the SLCM or ACM detects that this is not the case, the SLCM or ACM may take corrective action such as requesting that the UN try and re-configure UN network functions to address this issue (e.g., increase priority of SL session messages). Alternatively, the SLCM or ACM may also check to determine if there is another available UN that is available for use and if so, it may migrate the E2E SL Session over to this new UN. To do this, the SLCM or ACM may send the same type of request to the new UNCM in the new UN as it did to the original UN in the E2E SL Session Establishment procedure. Similarly it may also send a request to the old UNCM in the old UN to tear down this session as described in the E2E SL Session Tear-down procedure. If successful, the SLCM or ACM may begin using the new UN to process future E2E SL Session Communication Request/Response messages which it receives for this particular E2E SL Session.

Figure 16:
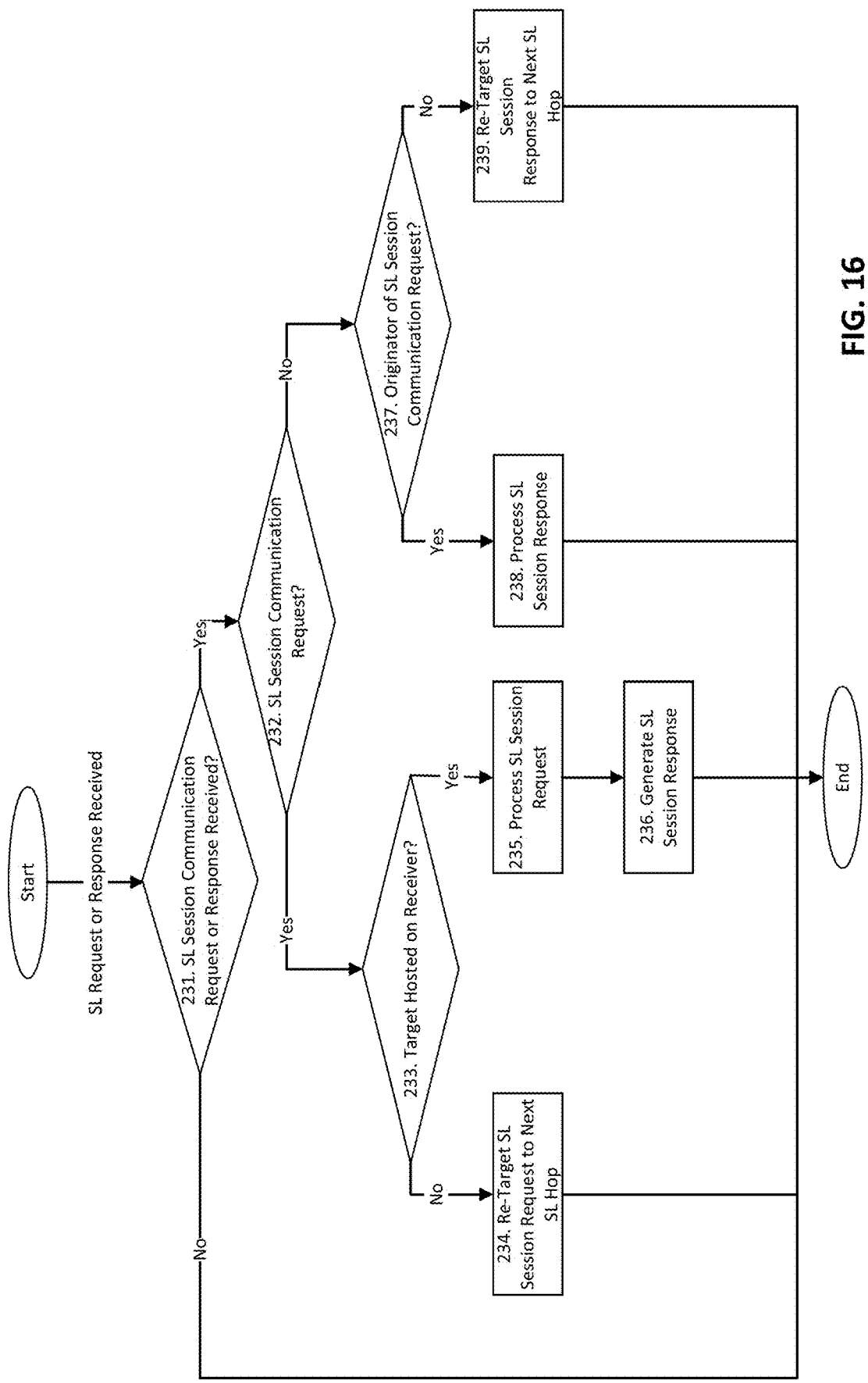
FIG. 16 illustrates an exemplary Method to Manage UN QoS While Receiving E2E SL Session Messages.

FIG. 16 illustrates an exemplary method to manage UN QoS while receiving E2E SL session messages. At step 231, a Receiver's SLCM or ACM (e.g., the originating SL session endpoint, an intermediate SL instance or the targeted SL session endpoint) detects an incoming SL message and checks whether or not it is a SL Session Communication Request or Response. This check is performed by analyzing header information in the SL message which indicates its SL message type. If it is a SL Session Communication Request or Response it proceeds to step 232. If it is neither the procedure exits. At step 232, the Receiver's SLCM or ACM checks whether it is a SL Session Communication Request or Response. At step 233, the Receiver's SLCM or ACM checks whether the targeted endpoint specified in the SL Session Communication Request is hosted locally or whether the request must be forwarded to another hop. This may be done by comparing the Receivers address with the targeted SL session endpoint's address. At step 234, if the request must be re-targeted to another SL hop, the Receiver's SLCM may use the procedure defined in FIG. 15 to do so. At step 235, after detecting that the SL Session Communication Request is targeting the Receiver, the Receiver may process the request (e.g., perform CRUD operation a resource hosted by the Receiver, or call a targeted function hosted by the Receiver, etc.). The Receiver may then compute a response (if applicable) that may contain application specific response information. At step 236, the Receiver's SLCM or ACM generates a SL Session Communication Response message. In this response, the Receiver's SLCM or ACM makes sure to include the same the E2E SL Session ID from the SL Session Communication Request such that the response may be handled as an E2E SL Session message by the intermediate SLs and UNs as it is routed back to the originator. To send the response, the Receiver's SLCM or ACM may use the procedure defined in FIG. 15.

With continued reference to FIG. 16, at step 237, the Receiver's SLCM or ACM checks the SL Session Communication Response to determine whether the Receiver is the originator of the request that corresponds to this response. To do this, the Receiver compares the E2E SL Session ID in the response with its locally stored state that it maintains for each SL Session Communication Request that it originates or that it re-targets. If the Receiver detects that SL Session ID matches a request that the Receiver initiated, then the Receiver knows it does not need to re-target response and that the Receiver should process the response itself. If the Receiver detects that the E2E SL Session ID matches a request that it re-targeted, then the Receiver knows it needs to re-target the response back to the same SL entity (e.g., intermediate SL instance or SL Session originating endpoint) from which it received the request from. If the Receiver does not recognize the E2E SL Session ID, then it drops the response and the procedure exits. At step 218, the Receiver is the originator of the SL Session Communication Request that corresponds with the received response. The Receiver processes the response and extracts the application specific response information from it. At step 219, the Receiver is not the originator of the SL Session Communication Request that corresponds with the received response, so the Receiver's SLCM forwards the response to the next hop. To do this, the Receiver's SLCM may use the procedure defined above in FIG. 15 to do so.

Figure 17:
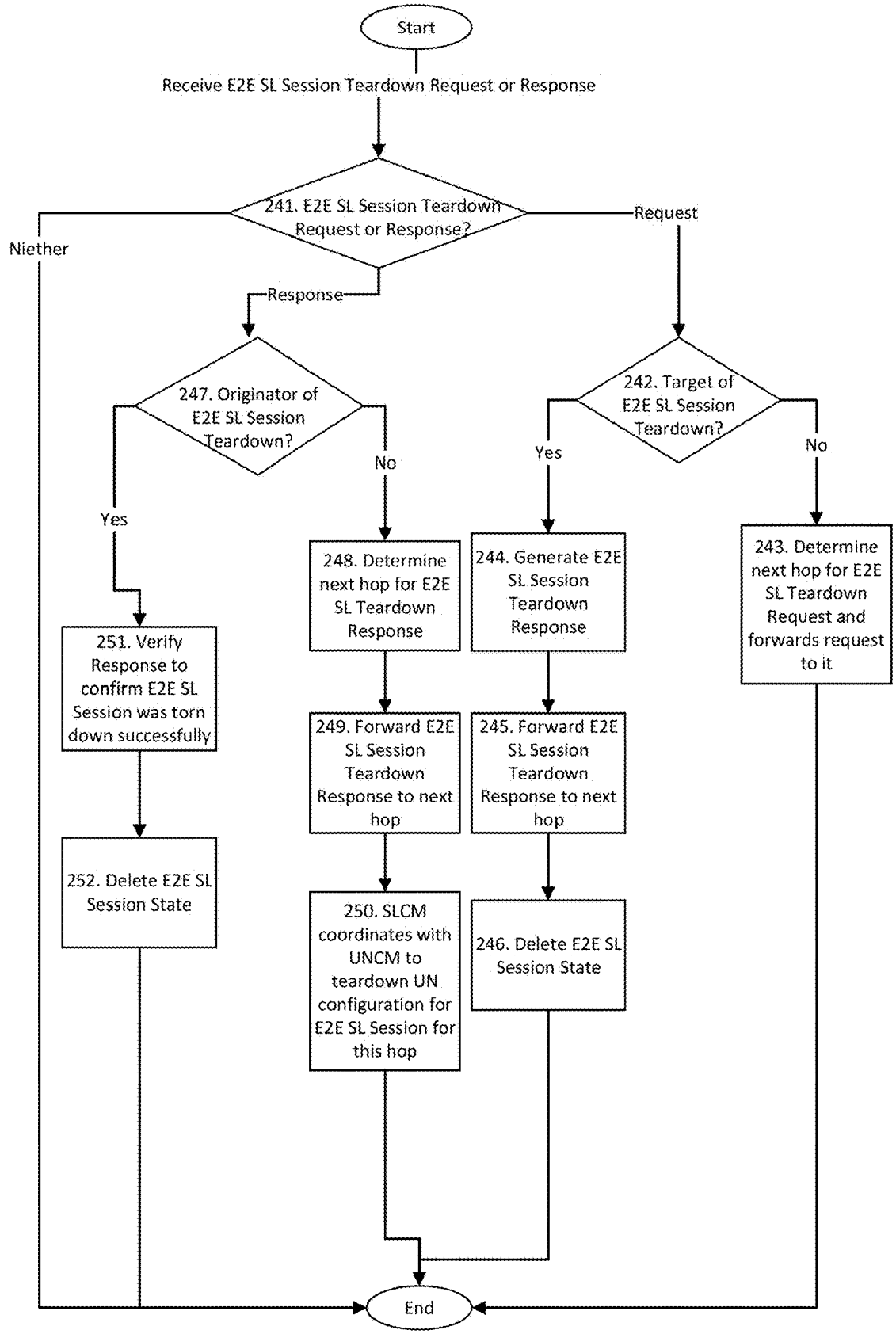
FIG. 17 illustrates an exemplary Method to Manage E2E SL Session Tear-Down.

FIG. 17 illustrates an exemplary method for managing UN connections during E2E SL session tear-down. A prerequisite to the procedure shown in FIG. 17 may be a SL registrant (e.g., a backend application) generating a request to teardown an E2E SL session between itself and a targeted SL session endpoint (e.g., device application). In this request, a SL registrant specifies the E2E SL Session ID as well as targeted session endpoint. This request is then forwarded to the SL registrant's local SL for processing. The point at which the E2E SL Session Teardown Request is received by the SL registrant's local SL, is the point at which the procedure defined in FIG. 17 starts. This procedure may be used to process the E2E SL Session Teardown Request as it is propagated hop by hop towards the targeted SL session endpoint. This procedure may also be to process the corresponding E2E SL Session Teardown Response as it flows back towards the SL registrant that originated the request. At step 241, a Receiver's SLCM or ACM (e.g., the originating SL session endpoint, an intermediate SL instance or the targeted SL session endpoint) detects an incoming SL message and checks whether or not it is a SL Session Teardown Request or Response. This check is performed by analyzing header information in the SL message which indicates its SL message type. If it is neither the procedure exits. At step 242, the Receiver's SLCM or ACM checks whether it is the target of the E2E SL Teardown Request. At step 243, if the request does not target the Receiver, the Receiver re-targets the E2E SL Teardown Request to the next hop. When doing this, the Receiver's SLCM maintains state that it re-targeted the request and it keeps track from which SL entity it received the request to be re-targeted. This information is kept tracked of using the E2E SL Session ID.

With continued reference to FIG. 17, at step 244, if the request does target the Receiver, the SLCM or ACM processes the request by first generating an E2E SL Session Teardown Response indicating that the SLCM or ACM received the response and that it agrees to tear down the session. At step 245, to send the response, the participant creates the response and configures the E2E Session ID to match the E2E Session ID specified in the request. The response may include other information such as application specific response information. The targeted destination is the E2E SL Session originator specified in the request. At step 246, the Receiver's SLCM or ACM deletes any state that was created during E2E SL Session Establishment or during E2E SL Session Communication. The SCLM or ACM also communicates with the UNCMs residing in each of the applicable UNs to delete a state that is maintained in the UN and to free reserved resources that are needed to service the E2E SL Session for this particular hop. This includes configuration on any of the UN functions used for E2E SL Session aware processing of messages affiliated having the E2E SL Session ID matching the session that is being torn down. At step 247, for the case where the incoming message is an E2E SL Session Teardown Response, the Receiver's SLCM or ACM checks whether the Response correlates to an E2E SL Session Teardown Request which the Receiver originated. At step 248, if no, the Receiver's SLCM determines the next hop to forward the response to. To do this the SLCM uses local state that it maintains for E2E SL Session Teardown Requests that it re-targets. Using the E2E SL Session ID, the SLCM looks up where it received the corresponding E2E SL Session Teardown Request that matches this E2E SL Session ID.

Figure 18:
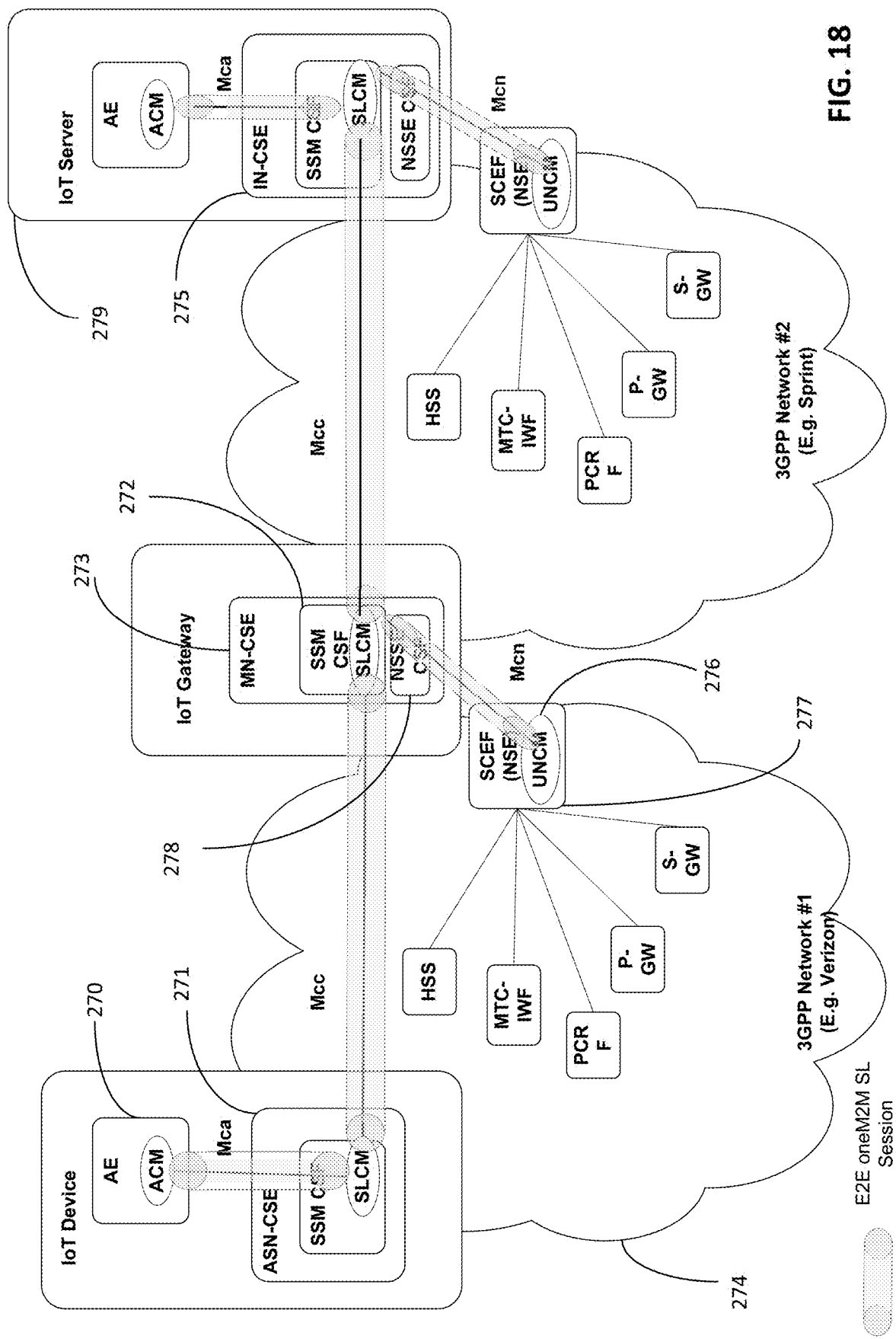
FIG. 18 illustrates an exemplary oneM2M/3GPP E2E SL QoS Management System.

At step 249, the response is then handed off from the SLCM or ACM to the corresponding UN that was assigned during E2E SL Session Establishment. The UN then forwards the message to the next hop. At step 250, the Receiver's SLCM or ACM deletes a state that was created during E2E SL Session Establishment or during E2E SL Session Communication. The SCLM or ACM also communicates with the UNCMs residing in each of the applicable UNs to delete a state that is maintained in the UN needed to service the E2E SL Session for this particular hop. This includes configuration on any of the UN functions used for E2E SL Session aware processing of messages affiliated having the E2E SL Session ID matching the session that is being torn down. At step 251, if the response correlates to an E2E SL Session Teardown Request that the Receiver originated, then the Receiver processes the response to verify that the session tear down was processed successfully by the targeted E2E SL Session endpoint. At step 252, the Receiver's SLCM or ACM (if supported) then deletes the state that was created during E2E SL Session Establishment or during E2E SL Session Communication. The SCLM or ACM also communicates with the UNCMs residing in each of the applicable UNs to delete any state that is maintained in the UN needed to service the E2E SL Session for this particular hop. This includes configuration on any of the UN functions used for E2E SL Session aware processing of messages affiliated having the E2E SL Session ID matching the session that is being torn down FIG. 18 illustrates an example in which a SLCM is realized as a supported function of the oneM2M defined Service Session Management (SSM) CSF. This SLCM enabled SSM CSF 272 is supported by oneM2M CSEs that are hosted on an IoT Device (e.g., ASN-CSE 271), IoT Gateway (e.g., MN-CSE 273), or IoT Server (IN-CSE 275).

This SLCM enabled SSM CSF 272 in turn interfaces via the oneM2M defined Network Service Exposure, Service Execution and Trigger (NSSE) CSF (e.g., NSSE CSF 278) with a UNCM. The UNCM function (e.g., UNCM 276) is realized as a function of a 3GPP defined Service Capability Exposure Function (SCEF), e.g., SCEF 277. SCEF 277 in turn interfaces to various other functions in the 3GPP network (e.g., 3GPP network 274). According to oneM2M's definition, SCEF 277 is an Underlying Network Services Entity (NSE). In FIG. 18, an E2E oneM2M SL Session is established between two oneM2M AEs (e.g., AE 270 and AE 279) which are separated by multiple CSE hops which span across 3GPP networks owned by two different network operators. Each oneM2M AE supports an ACM function. Together the SLCM, ACM and UNCM functions enable the oneM2M AEs to establish an E2E oneM2M SL Session with one another with application specific QoS requirements. Through the assistance of the SLCM, ACM, and UNCM functions, the oneM2M CSEs are able to coordinate with one another as well as with the two underlying 3GPP networks owned by different operators. Through this coordination, the proper adjustments and alignments of QoS parameters may be achieved both at the oneM2M service layer and in the underlying 3GPP networks. In doing so, the E2E QoS requirements of the AEs may be managed by the CSEs on a coordinated hop by hop basis and ultimately on an E2E basis using the proposed methods captured in this disclosure. As a result, the oneM2M AEs are able to communicate with one another using the E2E oneM2M SL session in a manner which meets their specified E2E QoS requirements.

An API may be defined for a oneM2M SSM CSF to allow an AE to establish a E2E oneM2M SL Session. An API may be based on resource definitions (e.g., RESTful API). Conventional resources may include <session>, <sessionPolicy>, and <sessionContext>. Enhancements may be made to the <session> and <sessionPolicy> resources that enables an AE to define, during the establishment of an E2E SL session, application specific E2E QoS requirements. API enhancements disclosed herein may be used to realize a oneM2M SLCM or ACM API. Discussed below are some enhancements that may be used to request the establishment or tear-down of an E2E SL Session by allowing an E2E SL Session originator (e.g., AE 270 or IoT device application 155) to create or delete these resources within its local CSE, respectively. In addition, these resources may also be used by intermediate CSEs to establish or tear-down an E2E SL Session in a hop by hop manner. This may be done by an intermediate CSE creating or deleting these resources on the next-hop CSE during the establishment or tear-down of an E2E SL Session, respectively. In doing, so, each CSE in a multi-hop E2E SL Session configuration may maintain a corresponding set of these resources for each E2E SL Session. These resources provide a CSE with awareness and the ability to maintain state for each E2E SL Session it helps support.

Figure 19:
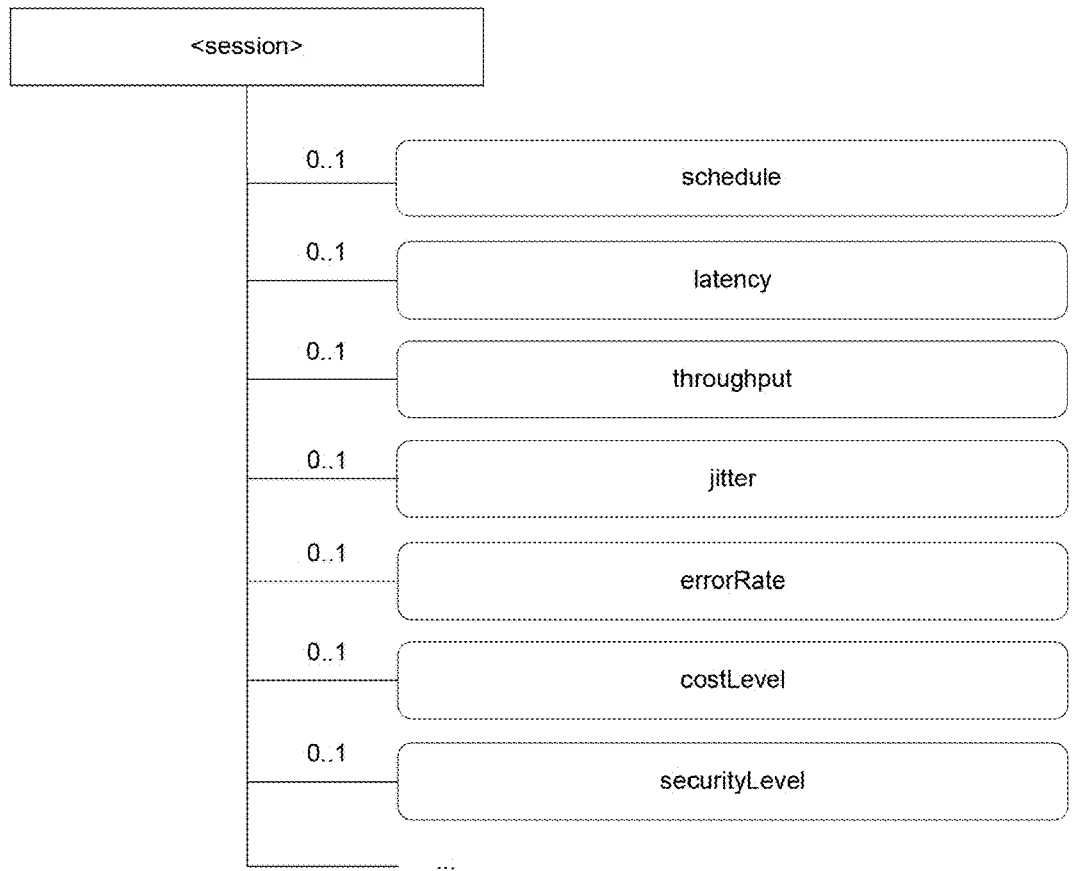
FIG. 19 illustrates an exemplary E2E SL Session QoS Requirements <session> Attributes.
Figure 20:
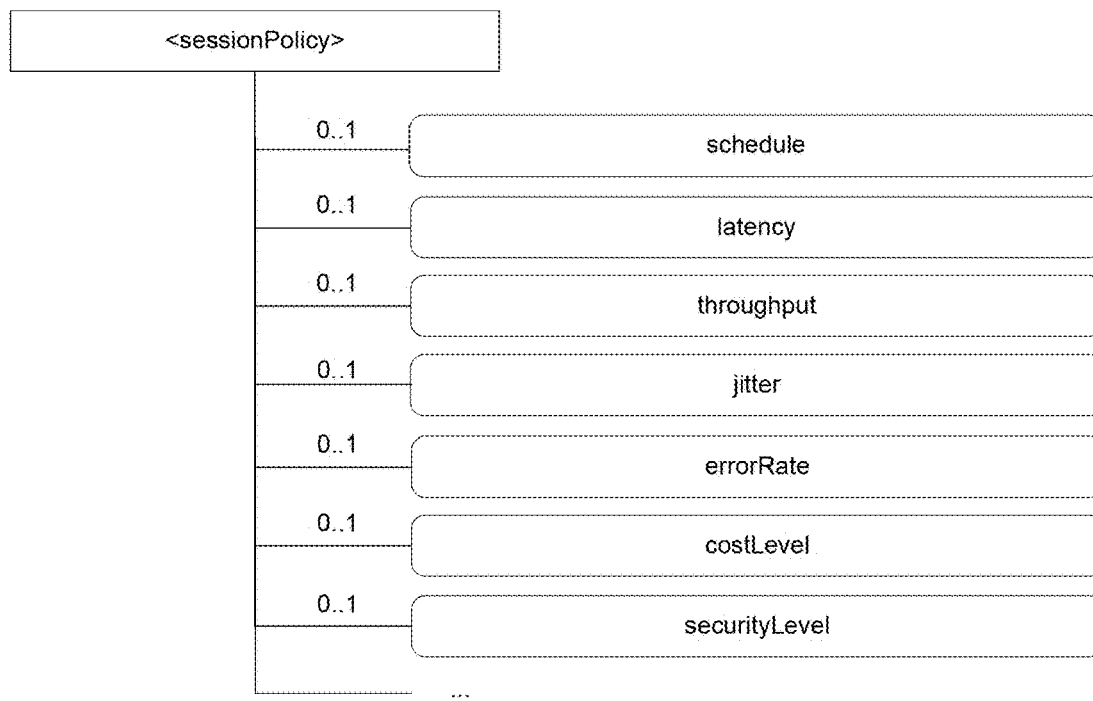
FIG. 20 illustrates an exemplary E2E SL Session QoS Requirements <sessionPolicy> Attributes.

FIG. 19 illustrates example enhancements to the oneM2M <session> resource. This includes multiple attributes to enable an AE to define application specific E2E QoS requirements associated with a particular oneM2M E2E SL Session. The attributes may be the schedule, latency, jitter, errorRate, throughput, costLevel, and securityLevel attributes which are defined in Table 4 and as shown in FIG. 19. In another example, instead of E2E SL Session QoS requirements defined within the <session> resource they may instead be defined in the oneM2M <sessionPolicy> resource as shown in FIG. 20.

TABLE 4

E2E Communication Attributes for oneM2M <session>
or <sessionPolicy> Resource

| Attribute Name | Multiplicity | Description |
| --- | --- | --- |
| schedule | 0 . . . 1 | See definition of Required E2E SL Session Reachability Schedule in Table 2 |
| latency | 0 . . . 1 | See definition of Required E2E SL Session Latency in Table 2 |
| throughput | 0 . . . 1 | See definition of Required E2E SL Session Throughput in Table 2 |
| jitter | 0 . . . 1 | See definition of Required E2E SL Session jitter in Table 2 |
| errorRate | 0 . . . 1 | See definition of Required E2E SL Session error rate in Table 2 |
| costLevel | 0 . . . 1 | See definition of Required E2E SL Session cost level in Table 2 |
| securityLevel | 0 . . . 1 | See definition of Required E2E SL Session security level in Table 2 |

Figure 21:
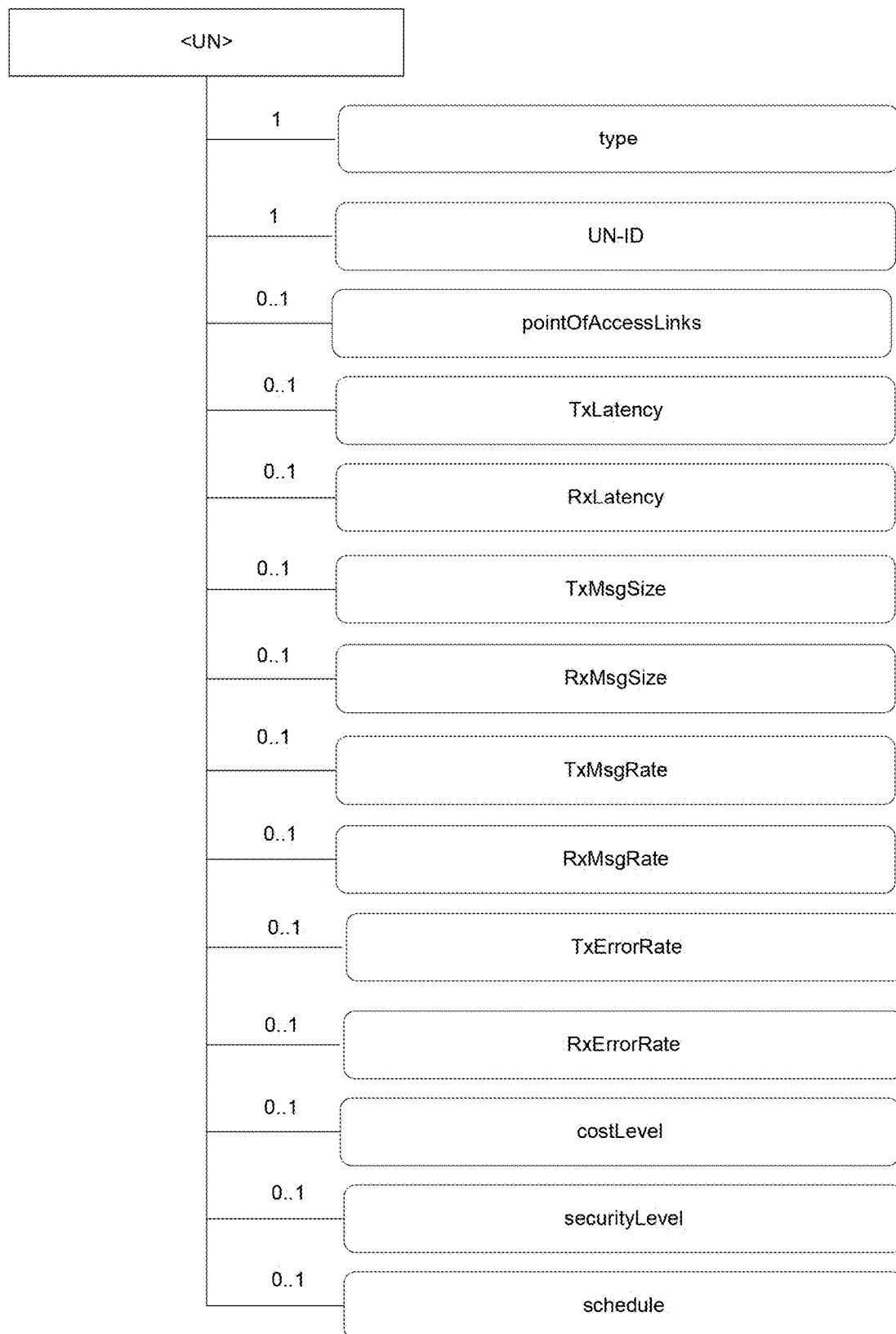
FIG. 21 illustrates an exemplary <UN> Resource and Attributes.

Conventionally oneM2M does not define a resource to maintain QoS centric information regarding the UNs which provide connectivity between a CSE and the AEs or other CSEs which are registered to it. Disclosed herein is a <UN> oneM2M resource as illustrated in FIG. 21, for example. This resource supports a set of attributes to track and maintain information which may be published or retrieved from an individual UN. A CSE may support a separate <UN> resource for each supported UN and use this resource to maintain information about the UN. Supporting this type of information provides visibility of the UN context (e.g., current reachability of an AE or CSE over this UN, communication latency, and communication throughput) to the CSE which may enable it to make UN aware decisions. For example, a CSE may rank the set of UNs available for communication with a neighboring CSE or AE based on this information and determine the most optimal use. The information maintained in the resource may be published via an UN (e.g., via a UNCM function supported by a SCEF affiliated with a 3GPP network), or retrieved from an UN (e.g., via a SLCM supported by a CSE), among other things. Table 5 provides exemplary attributes.

TABLE 5

<UN> Resource Attributes

| Attribute Name | Description |
| --- | --- |
| type | Type of this particular UN<br>E.g., 3GPP, Wi-Fi, Bluetooth, Ethernet, etc. |
| UN-ID | UN ID used to uniquely identify this UN versus other UNs<br>E.g., ID assigned by network operator |
| pointOfAccessLinks | A list of links to <pointOfAccess> resources for AEs or CSEs which have connectivity to this CSE via this UN. This attribute may be updated by a CSE (SLCM) for each AE or CSE which registers/de-registers or updates its pointOfAccess attribute. |
| TxLatency/RxLatency | Different supported latency levels for transmitting/receiving a message between this CSE and either an AE or another CSE over this UN.<br>This attribute may be updated with latency information published or retrieved from an UN (e.g., via an UNCM).<br>Latency may be expressed in a format such as 10 msec. |
| TxMsgSize/RxMsgSize | Max size of a transmitted/received message allowed over this UN and that are available to this CSE.<br>May be expressed in a format such as E.g., 256 bytes |
| TxMsgRate/RxMsgRate | Max rate of transmitted/received messages allowed over this UN and that are available to this CSE.<br>May be expressed in a format such as 500 requests/sec |
| TxErrorRate/RxErrorRate | Different transmit/receive error rates supported over this UN and that are available to this CSE. These error rates may be given in<br>May be expressed in a format such as 2 errors/sec, 5 retries/100 requests, etc. |
| costLevel | Different cost tiers supported by this UN that are available to this CSE. Cost tiers may have associated latency, throughput, schedule, error rates, security levels, etc. |
| securityLevel | Different levels/types of security supported by this UN that are available to this CSE. |
| schedule | Different connectivity schedules supported by the UN and that are available to this CSE |

Conventionally oneM2M defines a single pointOfAccess attribute for both the <AE> and <remoteCSE> resources. The conventional attribute is used to capture a list of UN addresses for a corresponding AE or CSE. When an AE or CSE registers to another registrar CSE, it may provide this information. This information may be used by the registrar CSE to contact the AE or CSE when it needs to send a message to it. Conventionally oneM2M defines the information stored in the pointOfAccess attribute as a list of IP addresses or FQDNs and ports. Each corresponding UN supported by the AE or CSE has an entry in this list. The pointOfAccess attribute as defined does not support any other UN information.

Figure 22:
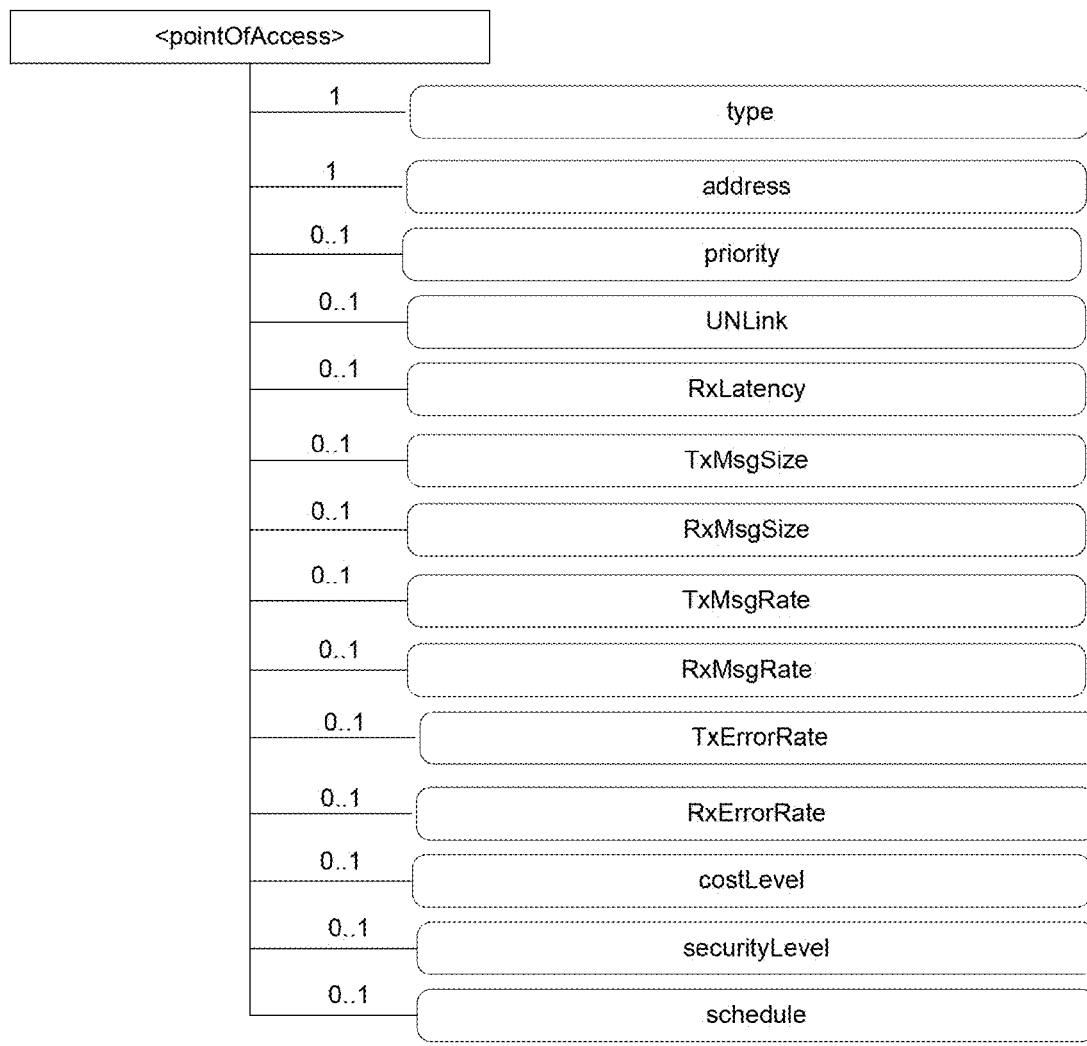
FIG. 22 illustrates an exemplary E2E SL Session QoS Requirements <pointOfAccess> Attributes.

Defined below are proposed enhancements to the oneM2M pointOfAccess attribute functionality to provide visibility for additional UN information to the CSE. FIG. 22 illustrates an exemplary E2E SL session QoS requirements <pointOfAcess> attribute. In a first example enhancement, the pointOfAccess attribute may be transformed into a resource having individual attributes of its own. Doing this creates a more conducive API between a CSE and its registrants allowing them to specify additional UN information.

In a second example enhancement, support for additional UN QoS related information may be added, such as the information disclosed in Table 3. Supporting this information for a given AE or CSE that is registered to the CSE, provides a registrar CSE with visibility to UN specific configuration and requirements for a given AE or CSE. This may enable the registrar CSE with UN specific information regarding each of its registrants. For example, a CSE may determine, for each AE or CSE which is registered to it, the set of UNs that are available for communication with that AE or CSE. Separately, the CSE has the UN requirements for each AE or CSE. This information may then be used to make more informed decisions on which UN to use when communicating with a particular AE or CSE. Table 6 provides exemplary attributes associated with FIG. 22.

TABLE 6

<pointOfAcess> Resource Attributes

| Attribute Name | Description |
| --- | --- |
| type | Type of this particular UN<br>E.g., 3GPP, Wi-Fi, Bluetooth, Ethernet, etc. |
| priority | Usage ranking of this UN with respect to the other UNs available for this SL session hop<br>E.g., 1st, 2nd, 3rd, etc. |
| address | UN address used to ID or trigger the SL entity that initiated the SL session establishment request over this SL session hop<br>E.g., IP Address, Port, MAC Address, etc. |
| UNLink | Link to a <UN> resource containing information regarding the status of the UN which is updated and maintained via communication with UN. |
| schedule | Reachability/connectivity schedule of AE or CSE via this UN<br>Schedule may be expressed in a format such as Seconds, Minutes, Hours, Days, Weeks, Months, and Years. |
| TxLatency/RxLatency | Required transmit/receive latency of AE or CSE over this UN<br>Latency may be expressed in a format such as 10 msec. |
| TxMsgSize/RxMsgSize | Required max transmitted/received message size of AE or CSE over this UN.<br>May be expressed in a format such as E.g., 256 bytes |
| TxMsgRate/RxMsgRate | Required max transmitted/received message rate of AE or CSE over this UN.<br>May be expressed in a format such as 500 requests/sec |
| TxErrorRate/<br>RxErrorRate | Required max error rate for transmitted/received messages of AE or CSE over this UN.<br>May be expressed in a format such as 2 errors/sec, 5 retries/100 requests, etc. |
| costLevel | Cost tier(s) required by CSE or AE over this UN |
| securityLevel | Different levels/types of security required by CSE or AE over this UN |

Figure 23:
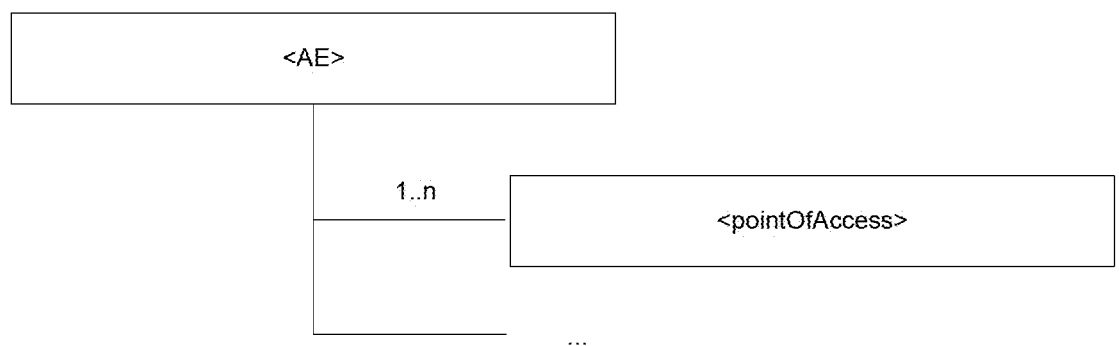
FIG. 23 illustrates an exemplary <pointOfAccess> Child Resource for <AE> Resource.
Figure 24:
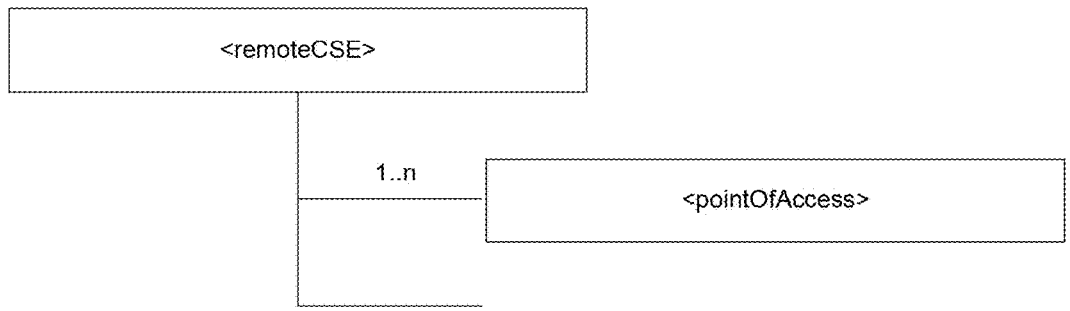
FIG. 24 illustrates an exemplary <pointOfAccess> Child Resource for <AE> Resource.

FIG. 23 and FIG. 24 illustrate exemplary <pointOfAccess> child resource for <AE> resource and <remoteCSE> resource. Herein <AE> or <remoteCSE> oneM2M resource may be allowed to support separate instances of the disclosed <pointOfAccess> resource as shown in FIG. 23 or FIG. 24, for example. A separate instance of <pointOfAccess> may be created by an AE or CSE to maintain its connectivity information for each UN providing connectivity between itself and its registrar CSE.

Disclosed herein is an API for a UNCM function that may be supported by a 3GPP defined SCEF. This disclosed API is RESTful in nature and defines a set of resources and attributes that may be accessed by a trusted application or 3$^{rd}$ party service (e.g., by a SLCM function supported by a oneM2M CSE).

Figure 25:
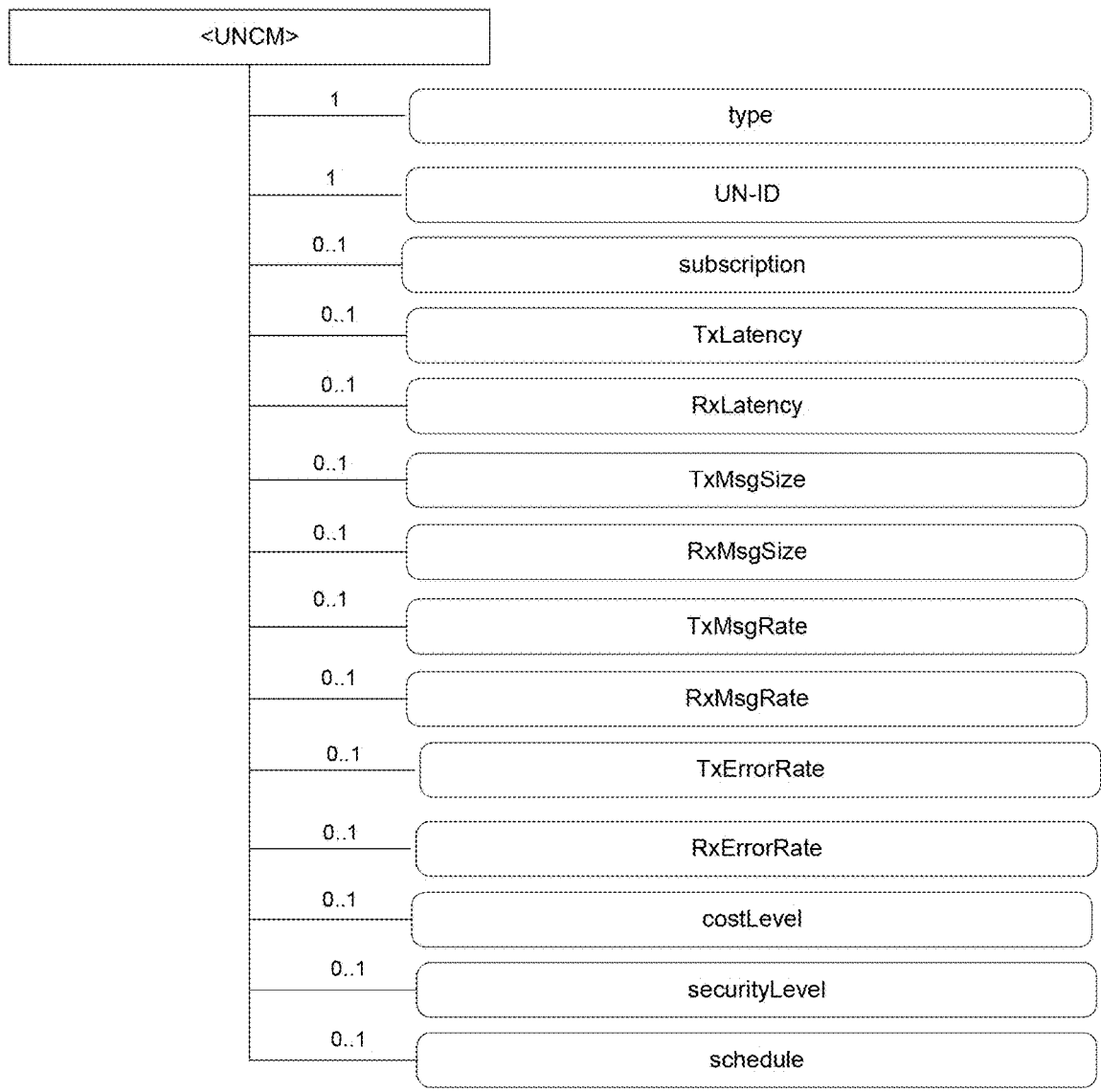
FIG. 25 illustrates an exemplary <UNCM> Resource and Attributes.

FIG. 25 illustrates an exemplary <UNCM> resource for 3GPP UNCM/SCEF. This resource supports a set of attributes to track and maintain UN information. A UNCM may support a separate <UNCM> resource for each UN it supports. A <UNCM> may support communicating with corresponding UN nodes/functions in the each respective UN to collect information which it then makes available via this resource. A UNCM may support retrieval requests to this resource as well as a subscription mechanism to allow a trusted application or service provider to receive UN information from the UNCM. For example, a SLCM function may retrieve a<UNCM> resource or it may create a subscription to receive a notification if any of the <UNCM> attributes are updated. Table 7 provides for an exemplary <UNCM> resource attributes and child resources.

TABLE 7

<UNCM> Resource Attributes and Child Resources

| Attribute Name | Description |
| --- | --- |
| type | Type of this particular UN<br>E.g., 3GPP, Wi-Fi, Bluetooth, Ethernet, etc. |
| UN-ID | UN ID used to uniquely identify this UN versus other UNs<br>E.g., ID assigned by network operator |
| TxLatency/RxLatency | Different supported latency levels for transmitting/<br>receiving a message between this CSE and either an AE or<br>another CSE over this UN.<br>This attribute may be updated with latency information<br>published or retrieved from an UN (e.g., via an UNCM).<br>Latency may be expressed in a format such as 10 msec. |
| TxMsgSize/RxMsgSize | Max size of a transmitted/received message allowed over<br>this UN and that are available to this CSE.<br>May be expressed in a format such as E.g., 256 bytes |
| TxMsgRate/RxMsgRate | Max rate of transmitted/received messages allowed over<br>this UN and that are available to this CSE.<br>May be expressed in a format such as 500 requests/sec |
| TxErrorRate/RxErrorRate | Different transmit/receive error rates supported over this<br>UN and that are available to this CSE. These error rates<br>may be given in<br>May be expressed in a format such as 2 errors/sec, 5<br>retries/100 requests, etc. |
| costLevel | Different cost tiers supported by this UN that are available<br>to this CSE. Cost tiers may have associated latency,<br>throughput, schedule, error rates, security levels, etc. |
| securityLevel | Different levels/types of security supported by this UN that<br>are available to this CSE. |
| schedule | Different connectivity schedules supported by the UN and<br>that are available to this CSE |
| subscription | Child resource of <UNCM> that may be used to subscribe<br>to updates that are made to this resource. If an update is<br>made, then a notification may be sent. |

Figure 26:
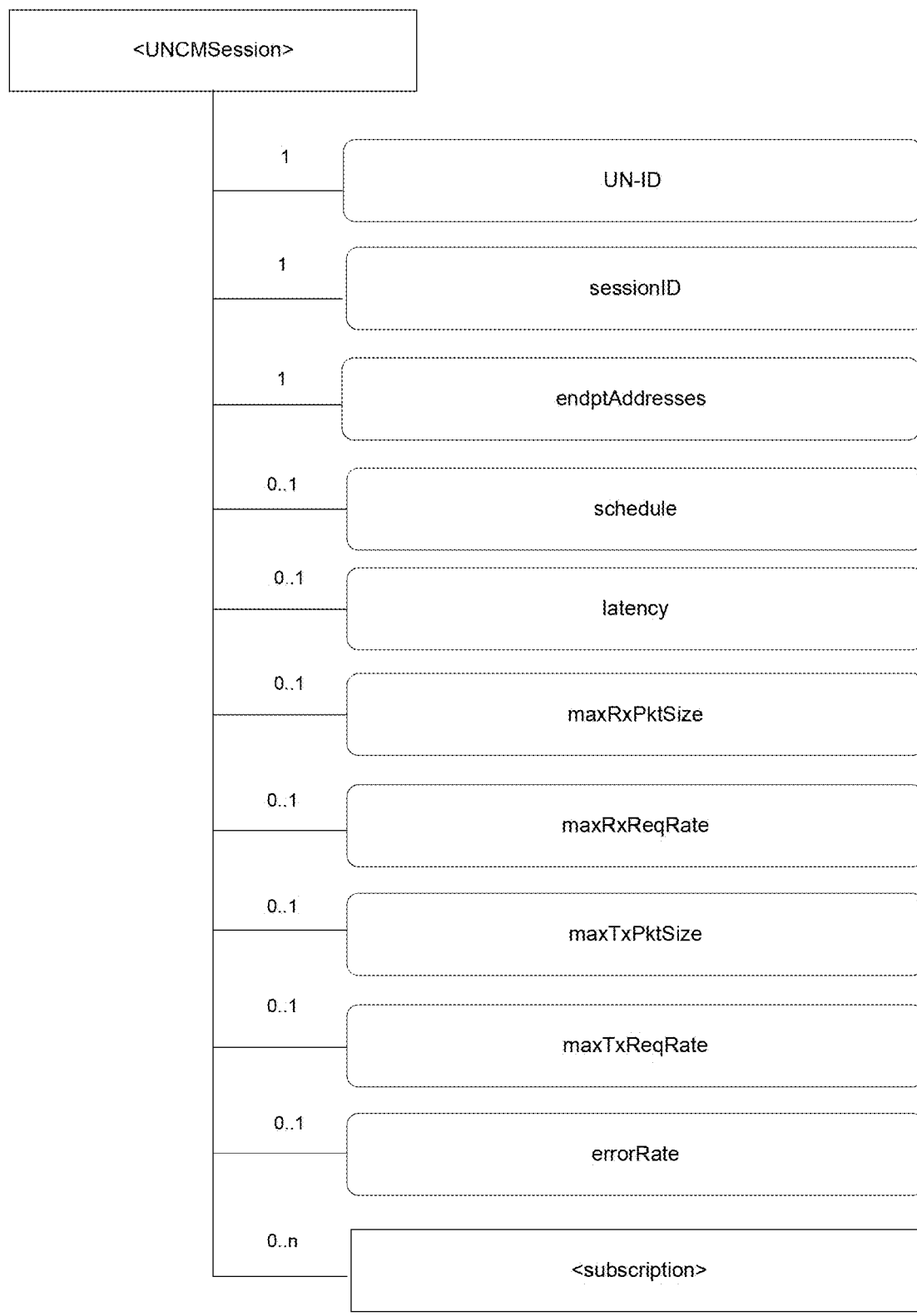
FIG. 26 illustrates an exemplary <UNCMSession> Resource.

FIG. 26 illustrates an exemplary <UNCMSession> resource for 3GPP UNCM/SCEF. This resource supports a set of attributes to allow a trusted application or service provider to create a communication session in an UN managed by the UNCM that corresponds with a SL session. For example, a SLCM function within a oneM2M CSE may create a <UNCMSession> resource to establish a single hop UN session between itself and a neighboring CSE. By configuring the sessionID attribute of <UNCMSession> resource with the E2E SL Session ID proposed in this disclosure, the SLCM may establish one hop of an E2E session. This process may be repeated for each hop in an E2E SL Session to form an E2E SL Session made up of multiple UN sessions. In addition to configuring the sessionID, the SLCM may also configure the other attributes to align with the E2E SL Session QoS requirements (schedule, latency, and throughput). The UNCM may in turn respond with a success or failure response based on whether the UN may create the session. If successful, the UNCM may configure the respective nodes with the sessionID and QoS requirements. This enables the UN to detect and process any messages containing the sessionID in a manner that is aligned with the QoS requirements. A SLCM may also update a <UNCMSession> resource to change the QoS requirements as well as delete a <UNCMSession> to tear down the session. Table 8 provides exemplary <UNCMSession> Resource Attributes and Child Resources.

TABLE 8

<UNCMSession> Resource Attributes and Child Resources

| Attribute Name | Description |
| --- | --- |
| UN-ID | UN ID used to uniquely identify this UN versus other UNs<br>E.g., ID assigned by network operator |
| sessionID | ID of session that may be used by UN as a marker to identify messages<br>affiliated with the UN session |
| endptAddresses | List of UN addresses of session endpoints that are participants in this<br>session. For unicast this will just be two addresses. For multicast or<br>broadcast this will just be one address (e.g., a multicast or broadcast<br>address) |
| schedule | Reachability/connectivity schedule of session endpoint(s) UN<br>Schedule may be expressed in a format such as Seconds, Minutes, Hours,<br>Days, Weeks, Months, and Years. |
| TxLatency/<br>RxLatency | Required transmit/receive latency of AE or CSE over this UN<br>Latency may be expressed in a format such as 10 msec. |
| TxMsgSize/<br>RxMsgSize | Required max transmitted/received message size of AE or CSE over<br>this UN.<br>May be expressed in a format such as E.g., 256 bytes |

TABLE 8-continued

<UNCMSession> Resource Attributes and Child Resources

| Attribute Name | Description |
| --- | --- |
| TxMsgRate/ RxMsgRate | Required max transmitted/received message rate of AE or CSE over this UN. May be expressed in a format such as 500 requests/sec |
| TxErrorRate/ RxErrorRate | Required max error rate for transmitted/received messages of AE or CSE over this UN. May be expressed in a format such as 2 errors/sec, 5 retries/100 requests, etc. |
| costLevel | Cost tier(s) required by CSE or AE over this UN |
| securityLevel | Different levels/types of security required by CSE or AE over this UN |
| subscription | Child resource of <UNCMSession> that may be used to subscribe to updates that are made to this resource. If an update is made, then a notification may be sent. |

Figure 27:
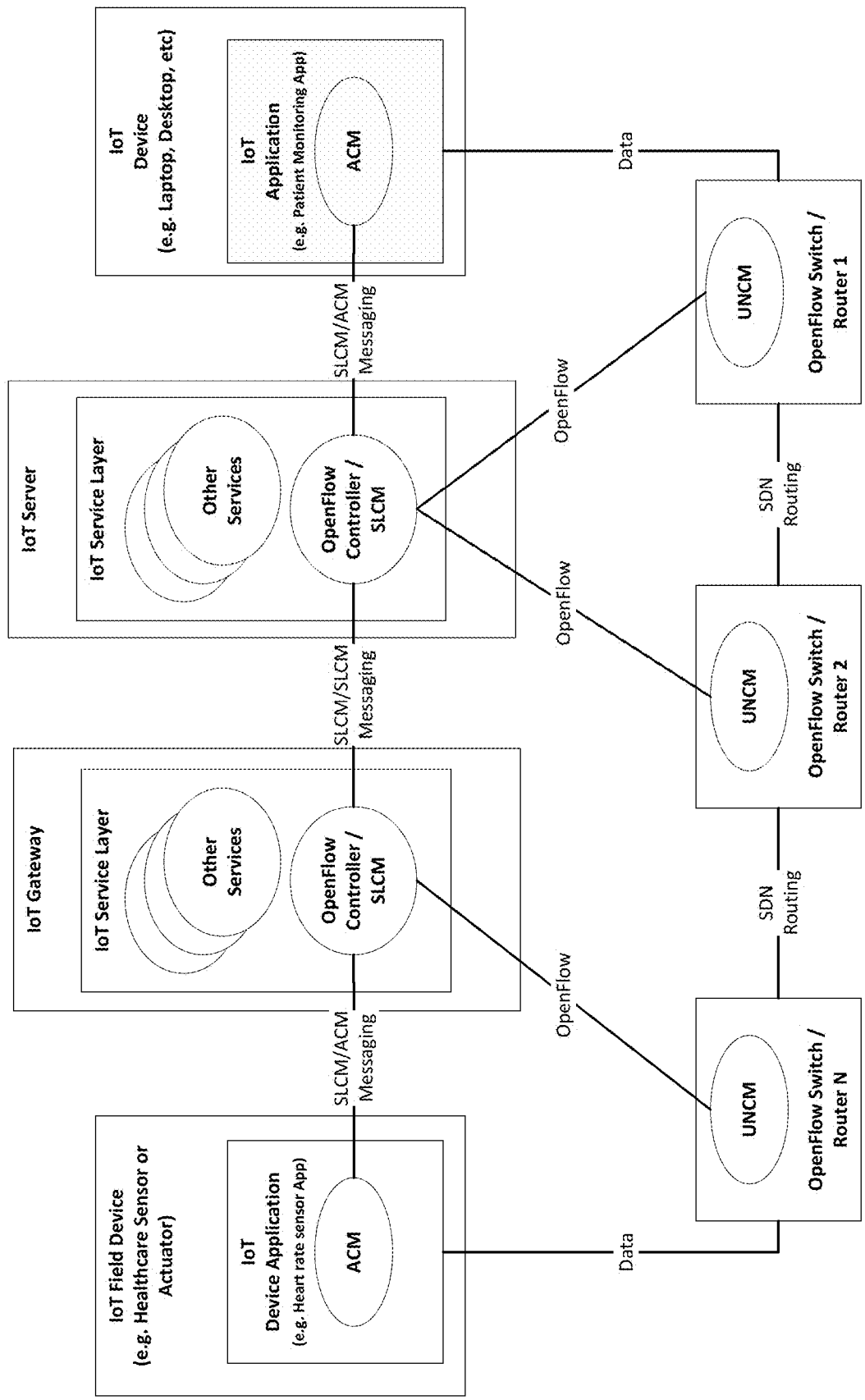
FIG. 27 illustrates an exemplary IoT Service Layer Open-Flow.

FIG. 27 illustrates an example of a Software Defined Networking (SDN) system based upon OpenFlow wherein OpenFlow capable switches or routers interconnect an IoT device, gateway, server and backend application. See Open Flow Switch Specification 1.3.4, Mar. 24, 2014, https://www.opennetworking.org/ja/sdn-resources-ja/onf-specifications/openflow and Open Flow Controller-Switch 1.0, Aug. 15, 2014, https://www.opennetworking.org/ja/sdn-resources-ja/onf-specifications/openflow, which are both incorporated by reference in their entirety.

With continued reference to FIG. 27, each OpenFlow capable switch or router is enabled with a UNCM function. This UNCM function interfaces to a SLCM function supported by a M2M/IoT SL hosted by both the M2M/IoT gateway and server. The SLCM function may invoke OpenFlow Controller functions in order to communicate with a UNCM implemented on an Open-Flow capable Switch or Router.

In this example, an E2E oneM2M SL Session is established between two applications which are separated by multiple M2M/IoT service layer hops which span across multiple underlying OpenFlow capable switches or routers.

Together the SLCM, ACM and UNCM functions enable the applications to establish an E2E SL Session with one another in which application specific QoS requirements may be defined such as E2E reachability schedules, E2E latency, and E2E throughput. Through the assistance of the SLCM, ACM and UNCM functions, the SLs are able to coordinate with one another as well as with the underlying OpenFlow capable switches/routers. Through this coordination, the proper adjustments and alignments of reachability schedules, latency, and throughput may be achieved both at the service layer and in the underlying routers. In doing so, the E2E QoS requirements of the AEs may be managed by the SLs on a coordinated hop by hop basis and ultimately on an E2E basis using the proposed methods captured in this disclosure. As a result, the applications are able to communicate with one another using the E2E SL session in a manner which meets their specified E2E QoS requirements.

Figure 28:
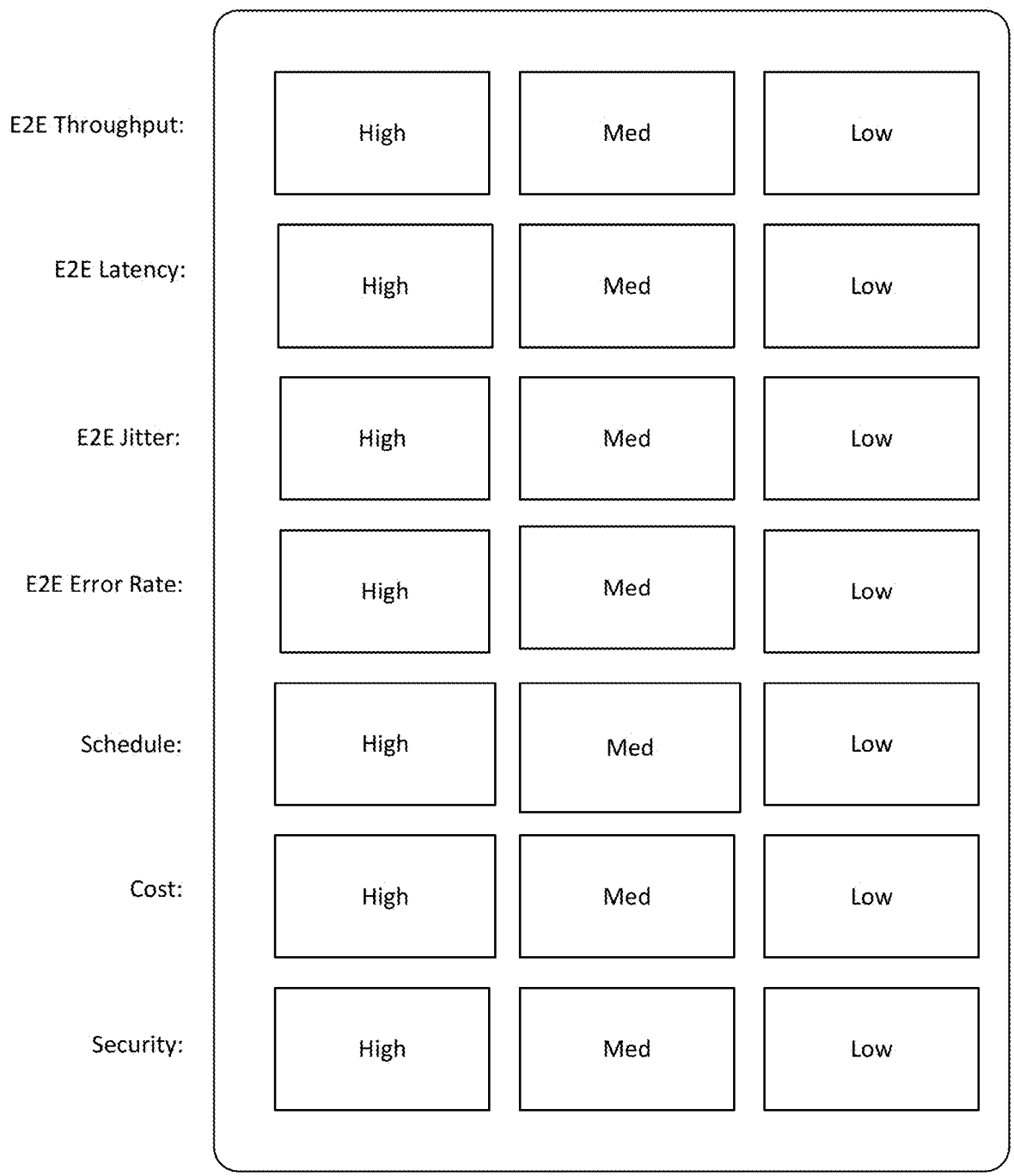
FIG. 28 illustrates an exemplary E2E QoS Graphical User Interface.

FIG. 28 illustrates an example of a Graphical User Interface which may be used to configure E2E QoS. The graphical user interface as shown provides for a selection terms as provided in Table 2 as an example. This GUI may be supported as native feature of the ACM or SLCM functions defined in this disclosure. Alternatively, this GUI may be implemented as its own function which the ACM or SLCM functions may interface to. This GUI may allow a user to configure a desired level of E2E QoS between itself (or an application under its control) and one or more targeted M2M/IoT devices (or applications hosted on these devices).

The GUI may support one or more of the QoS parameters defined in Table 2. The GUI may support user-friendly settings/options for QoS parameters such as high, med, low. The GUI and/or ACM or SLCM may in turn translate these GUI settings into values more detailed/specific QoS settings that are better interpreted by underlying networks. For example, high, med, low throughput may be translated into >10 Mbits/sec, <10 Mbits/sec but >1 Mbits/sec, and <1 MBits/sec, respectively. Alternatively, the GUI may support more specific options and/or values.

Figure 29:
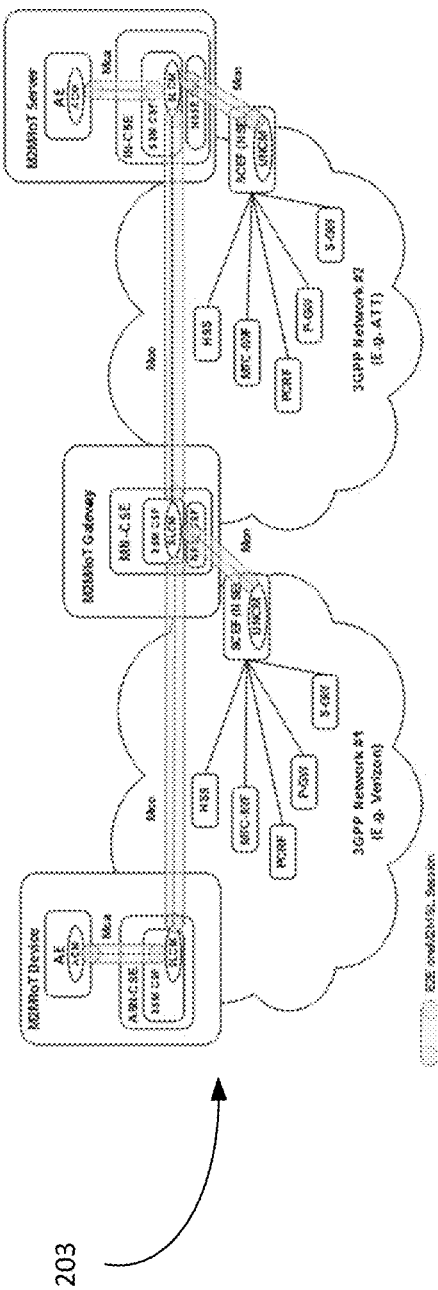
FIG. 29 illustrates an exemplary display generated using SL QoS associated components.

FIG. 29 illustrates an exemplary display (e.g., graphical user interface) that may be generated based on the methods and systems discussed herein. Display interface 201 (e.g., touch screen display) may provide text in block 202 associated with service layer quality of service management, such as the parameters of Table 1 through Table 8. In another example, progress of any of the steps (e.g., sent messages or success of steps) discussed herein may be displayed in block 202. In addition, graphical output 203 may be displayed on display interface 201. Graphical output 203 may be the topology of the devices as they span multiple networks, a graphical output of the progress of any method or systems discussed herein, or the like FIG. 30A is a diagram of an example machine-to machine (M2M), Internet of Things (IoT), or Web of Things (WoT) communication system 10 in which one or more disclosed concepts associated with IoT E2E service layer QoS Management may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 30A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 30A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 30B, the illustrated M2M service layer 22 (e.g., IoT service layer 166 as described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 30B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using SL QoS, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The SL QoS management of the present application may be implemented as part of a service layer. The service layer (e.g., IoT SL 166) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the SL QoS management of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (e.g., service capabilities). An instantiation of a set of one or more particular types of CSFs is referred to as a Common Services Entity (CSE), which can be hosted on different types of network nodes (e.g., infrastructure node, middle node, application-specific node). Further, the SL QoS management of the present application can be implemented as part of an M2M network that uses a Service Oriented Architecture (SOA) and/or a resource-oriented architecture (ROA) to access services such as the SL QoS management of the present application.

As discussed herein, the service layer may be considered a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications or various devices with access to a collection of or a set of the above mentioned capabilities or functionalities, supported by the service layer, which can be referred to as a CSE or service capability layer (SCL). A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (e.g., functional interfaces between such functional entities) in order for them to use such capabilities or functionalities.

FIG. 30C is a system diagram of an example M2M device 30, such as an M2M terminal device 18 (e.g., IoT device 153) or an M2M gateway device 14 (e.g., IoT gateway 152) for example. As shown in FIG. 30C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., IoT device 130, IoT gateway 152, IoT server 151, IoT device 154, and others) may be an exemplary implementation that performs the disclosed systems and methods for SL QoS management.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 30C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 30C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the LMS in some of the examples described herein are successful or unsuccessful (e.g., SL QoS request or response, etc.), or otherwise indicate a status of SL QoS management and associated components. The control lighting patterns, images, or colors on the display or indicators 42 may be reflective of the status of any of the method flows or components in the FIG.'s illustrated or discussed herein (e.g., FIG. 9-FIG. 29, etc.). Disclosed herein are messages and procedures of SL QoS management as well as resource for SL QoS management. The messages and procedures can be extended to provide interface/API for users to request resource-related resources via an input source (e.g., speaker/microphone 38, keypad 40, or display/touchpad 42) and request, configure, or query SL QoS of resources, among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. 30D is a block diagram of an exemplary computing system 90 on which, for example, the M2M service platform 22 of FIG. 30A and FIG. 30B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for SL QoS management, such as receiving SL QoS requests or responses.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 30A and FIG. 30B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—IoT E2E SL QoS management—as illustrated in the Figures, specific terminology is employed for the sake of clarity. For example, the term required (e.g., Table 2) may be used to effectuate a preference not just a requirement. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for IoT E2E SL QoS management. A method, system, computer readable storage medium, or apparatus has means for determining end-to-end quality of service requirements for an application; forwarding a request for an end-to-end service layer session to be established, the request including the determined end-to-end quality of service requirements for the application; receiving a message confirming establishment of the end-to-end service layer session with a remote apparatus; and responsive to receiving a message confirming establishment of an end-to-end service layer session with the remote apparatus, communicating using the end-to-end service layer session. The message may include a service layer identification for the established end-to-end service layer session. The application may provide the quality of service requirement to a service layer that configures an underlying network, the underlying network connecting the apparatus and another service layer apparatus. The application may provide the quality of service requirement to a service layer via the request, the service layer configures an underlying network, the underlying network connecting the apparatus and another service layer apparatus. The quality of service requirement may include a minimum throughput threshold for the end-to-end service layer session. The quality of service requirement may include a minimum reachability schedule for the end-to-end service layer session or a minimum jitter threshold for the end-to-end service layer session. The quality of service requirement may include a minimum error rate threshold for the end-to-end service layer session or a minimum latency threshold for the end-to-end service layer session. The quality of service requirement may include a minimum security level threshold for the end-to-end service layer session. All combinations in this paragraph (including the removal or addition of steps) are contemplated in a manner that is consistent with the other portions of the detailed description.

What is claimed:

1. A first apparatus implementing a connection manager service comprising:
   a processor; and
   a memory coupled with the processor, the memory comprising executable instructions that when executed by the processor cause the processor to effectuate operations comprising:
   receiving, from a first application, a RESTful request to create a connection manager service resource to configure end-to-end quality of service requirements for one or more underlying networks connecting a second application on a second apparatus to a third application on a third apparatus, wherein the end-to-end quality of service requirements comprise at least one of a minimum reachability schedule of when the second application requires the third application to be available to receive requests from the second application and a maximum throughput defining a bit rate at which the second application can send or receive requests to or from the third application, wherein the connection manager service resource is created via a RESTful API of the connection manager service;
   based on the RESTful request, determining the end-to-end quality of service requirements for the one or more underlying networks connecting the second application and the third application;
   configuring the one or more underlying networks with quality-of-service settings for the one or more underlying networks connecting the second application and the third application;
   determining whether the configuration of the one or more underlying networks connecting the second application and the third application meet the end-to-end quality of service requirements of the second application have been met; and
   sending a response to the first application, wherein the response comprises a status code indicating that the connection manager service resource has been successfully created.

2. The first apparatus of claim 1, wherein the RESTful request comprises application endpoint addresses for the first application and the second application.

3. The first apparatus of claim 1, wherein the end-to-end quality of service requirements comprises a jitter threshold for requests which the second application sends or receives to or from the third application.

4. The first apparatus of claim 1, wherein the end-to-end quality of service requirements comprise a minimum latency threshold for requests which the second application sends or receives to or from the third application.

5. The first apparatus of claim 1, wherein the end-to-end quality of service requirements comprise a minimum error rate threshold for requests which the second application sends or receives to or from the third application.

6. The first apparatus of claim 1, wherein the end-to-end quality of service requirements comprise a minimum security level threshold for requests which the second application sends or receives to or from the third application.

7. A method for controlling a connection manager service, the method comprising:
   receiving, from a first application, a RESTful request to create a connection manager service resource to configure end-to-end quality of service requirements for one or more underlying networks connecting a second application on a second apparatus to a third application on a third apparatus, wherein the end-to-end quality of service requirements comprise at least one of a minimum reachability schedule of when the second application requires the third application to be available to receive requests from the second application and a maximum throughput defining a bit rate at which the second application can send or receive requests to or from the third application, wherein the connection manager service resource is created via a RESTful API of the connection manager service;
   based on the RESTful request, determining the end-to-end quality of service requirements for the one or more underlying networks connecting the second application and the third application;
   configuring the one or more underlying networks with quality-of-service settings for the one or more underlying networks connecting the second application and the third application;
   determining whether the configuration of the one or more underlying networks connecting the second application and the third application meet the end-to-end quality of service requirements of the second application have been met; and
   sending a response to the first application, wherein the response comprises a status code indicating that the connection manager service resource has been successfully created.

8. The method of claim 7, wherein the RESTful request comprises application endpoint addresses for the first application and the second application.

9. The method of claim 7, wherein the end-to-end quality of service requirements comprises a jitter threshold for requests which the second application sends or receives to or from the third application.

10. The method of claim 7, wherein the end-to-end quality of service requirements comprise a minimum latency threshold for requests which the second application sends or receives to or from the third application.

11. The method of claim 7, wherein the end-to-end quality of service requirements comprise a minimum error rate threshold for requests which the second application sends or receives to or from the third application.

12. The method of claim 7, wherein the end-to-end quality of service requirements comprise a minimum security level threshold for requests which the second application sends or receives to or from the third application.

* * * * *